(12) United States Patent
Park et al.

(10) Patent No.: US 10,474,281 B2
(45) Date of Patent: Nov. 12, 2019

(54) TOUCH DISPLAY DRIVING INTEGRATED CIRCUIT, OPERATION METHOD OF THE SAME, AND TOUCH DISPLAY DEVICE INCLUDING THE SAME

(71) Applicant: SAMSUNG ELECTRONICS CO., LTD., Suwon-si (KR)

(72) Inventors: Haewoon Park, Yangpyeong-gun (KR); Seung-Hoon Baek, Seongnam-si (KR); Jaehun Jeong, Hwaseong-si (KR); Hyeokchul Kwon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 15/426,228

(22) Filed: Feb. 7, 2017

(65) Prior Publication Data

US 2017/0242529 A1 Aug. 24, 2017

(30) Foreign Application Priority Data

Feb. 24, 2016 (KR) .................. 10-2016-0021887
May 4, 2016 (KR) .................. 10-2016-0055629

(51) Int. Cl.
*G06F 3/041* (2006.01)
*G06F 3/044* (2006.01)
*G09G 3/20* (2006.01)

(52) U.S. Cl.
CPC ............ *G06F 3/0416* (2013.01); *G06F 3/044* (2013.01); *G06F 3/0412* (2013.01); *G09G 3/20* (2013.01)

(58) Field of Classification Search
CPC ...... G06F 3/041; G06F 3/0412; G06F 3/0416; G06F 3/044; G06F 2203/04107

USPC .................................................... 345/173, 174
See application file for complete search history.

(56) References Cited

U.S. PATENT DOCUMENTS

| 8,372,583 | B2* | 2/2013 | Takahashi | A61K 31/7105 |
| | | | | 435/6.14 |
| 8,922,521 | B2* | 12/2014 | Hotelling | G06F 1/3218 |
| | | | | 345/174 |
| 8,941,640 | B2 | 1/2015 | Bae | |
| 9,075,463 | B2* | 7/2015 | Pyo | G09G 3/00 |
| 9,110,546 | B2 | 8/2015 | Kim et al. | |
| 9,285,910 | B2* | 3/2016 | Kim | G06F 3/0412 |
| 9,329,674 | B2* | 5/2016 | Lee | G06F 3/0412 |
| 9,542,026 | B2* | 1/2017 | Lee | G06F 3/0412 |
| 2013/0314343 | A1 | 11/2013 | Cho et al. | |
| 2013/0328952 | A1 | 12/2013 | Bae | |

(Continued)

FOREIGN PATENT DOCUMENTS

| KR | 10-2015-0056686 A | 5/2015 |
| KR | 10-2015-0080164 A | 7/2015 |
| KR | 10-2015-0103432 A | 9/2015 |

*Primary Examiner* — Jason M Mandeville
(74) *Attorney, Agent, or Firm* — Sughrue Mion, PLLC

(57) ABSTRACT

A touch display driving integrated circuit (IC) includes a touch driver IC configured to be connected to touch electrodes through touch sensing lines and provide a sensing signal to first touch sensing lines among the touch sensing lines in a touch period. The touch driver IC is further configured to apply a common voltage to second touch sensing lines among the touch sensing lines and apply a voltage different from the common voltage to third touch sensing lines different from the second touch sensing lines in a display period.

20 Claims, 25 Drawing Sheets

(56) References Cited

U.S. PATENT DOCUMENTS

| | | |
|---|---|---|
| 2013/0335343 A1* | 12/2013 | Lee .......................... G06F 3/01 |
| | | 345/173 |
| 2013/0342479 A1* | 12/2013 | Pyo ......................... G09G 3/00 |
| | | 345/173 |
| 2013/0342498 A1 | 12/2013 | Kim et al. |
| 2014/0184539 A1 | 7/2014 | Shin |
| 2014/0184543 A1* | 7/2014 | Kim ..................... G06F 3/0412 |
| | | 345/173 |
| 2014/0306906 A1 | 10/2014 | Huang et al. |
| 2014/0347318 A1 | 11/2014 | Kim |
| 2015/0002421 A1* | 1/2015 | Kim ....................... G06F 3/041 |
| | | 345/173 |
| 2015/0002460 A1 | 1/2015 | Lee |
| 2015/0062080 A1 | 3/2015 | Kang |
| 2017/0090624 A1* | 3/2017 | Kwon ................... G06F 3/0416 |
| 2017/0123529 A1* | 5/2017 | Ho ......................... G06F 3/044 |
| 2017/0269781 A1* | 9/2017 | Yang ..................... G06F 3/0412 |
| 2018/0024677 A1* | 1/2018 | Kim ..................... G06F 3/0412 |
| | | 345/173 |

\* cited by examiner

FIG. 7
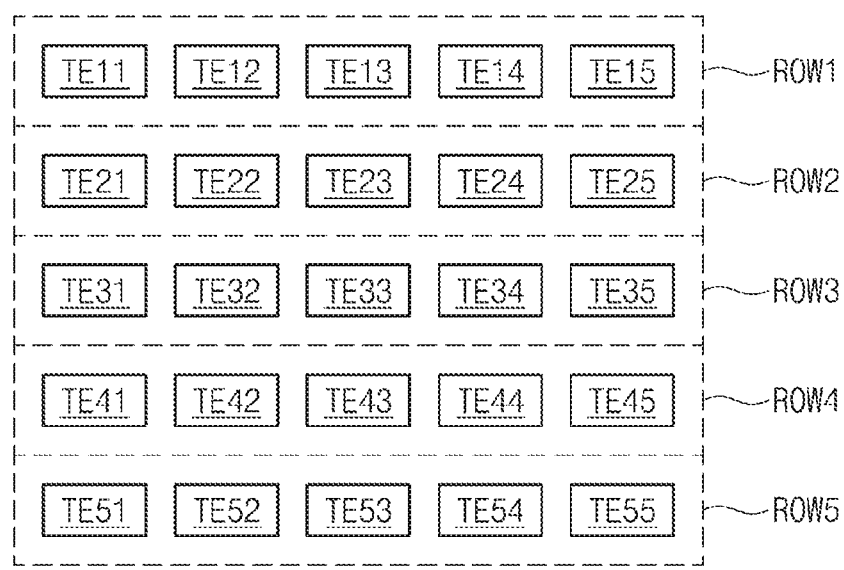
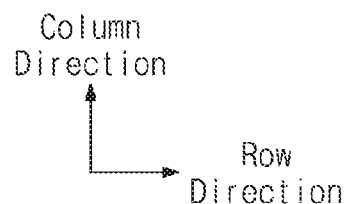

FIG. 10
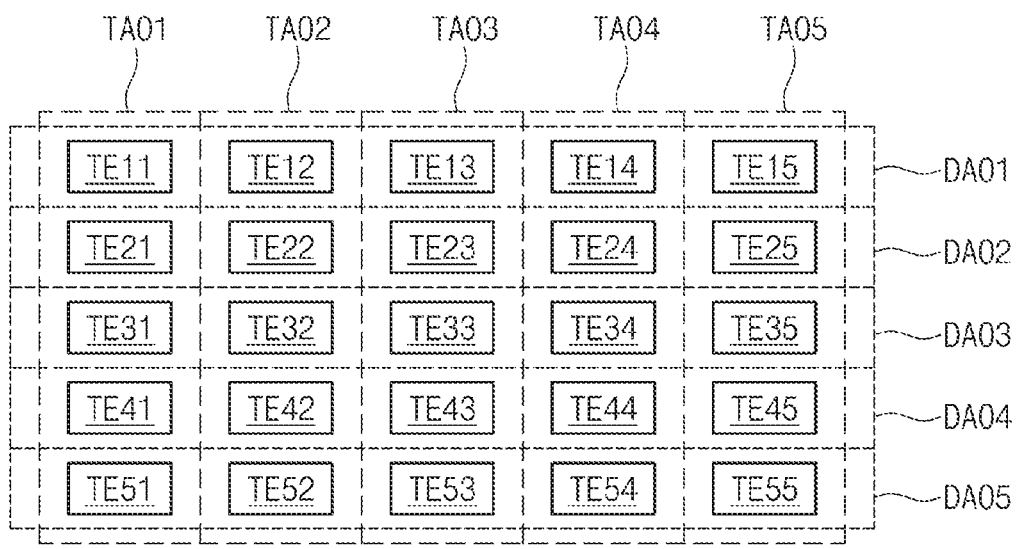
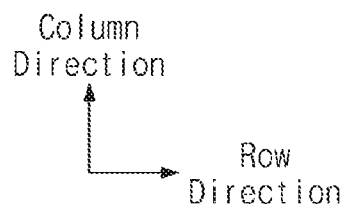

FIG. 13
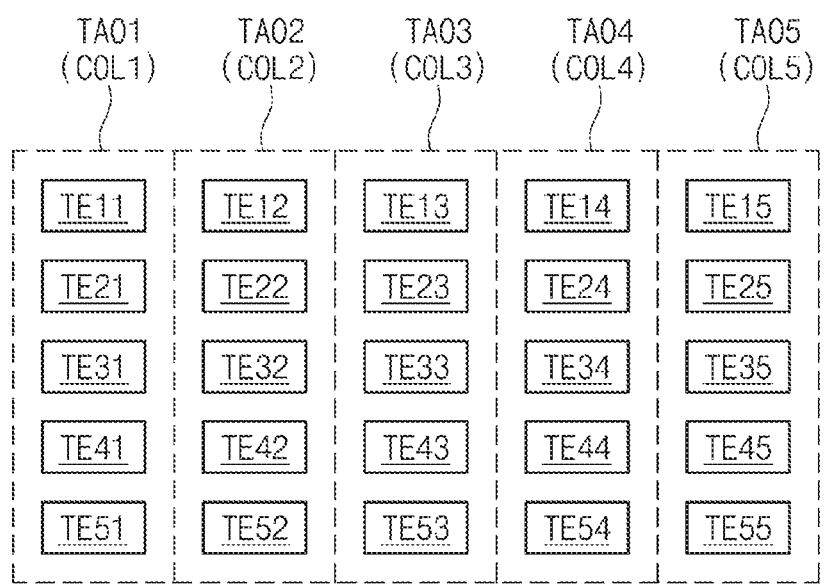
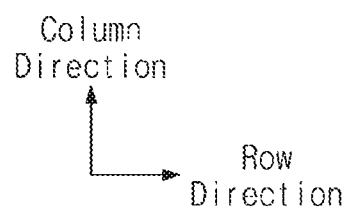

FIG. 20
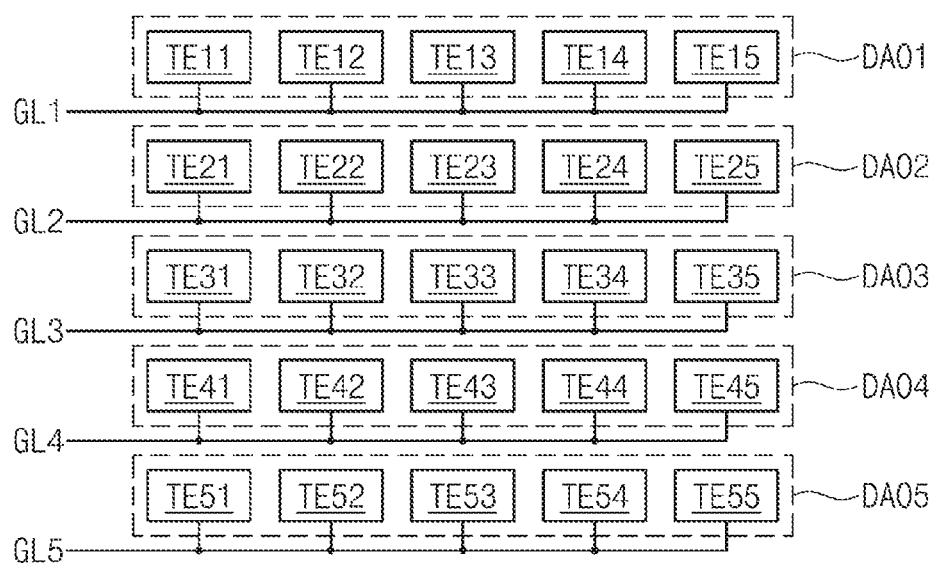
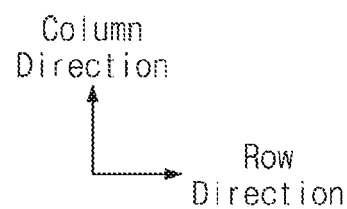

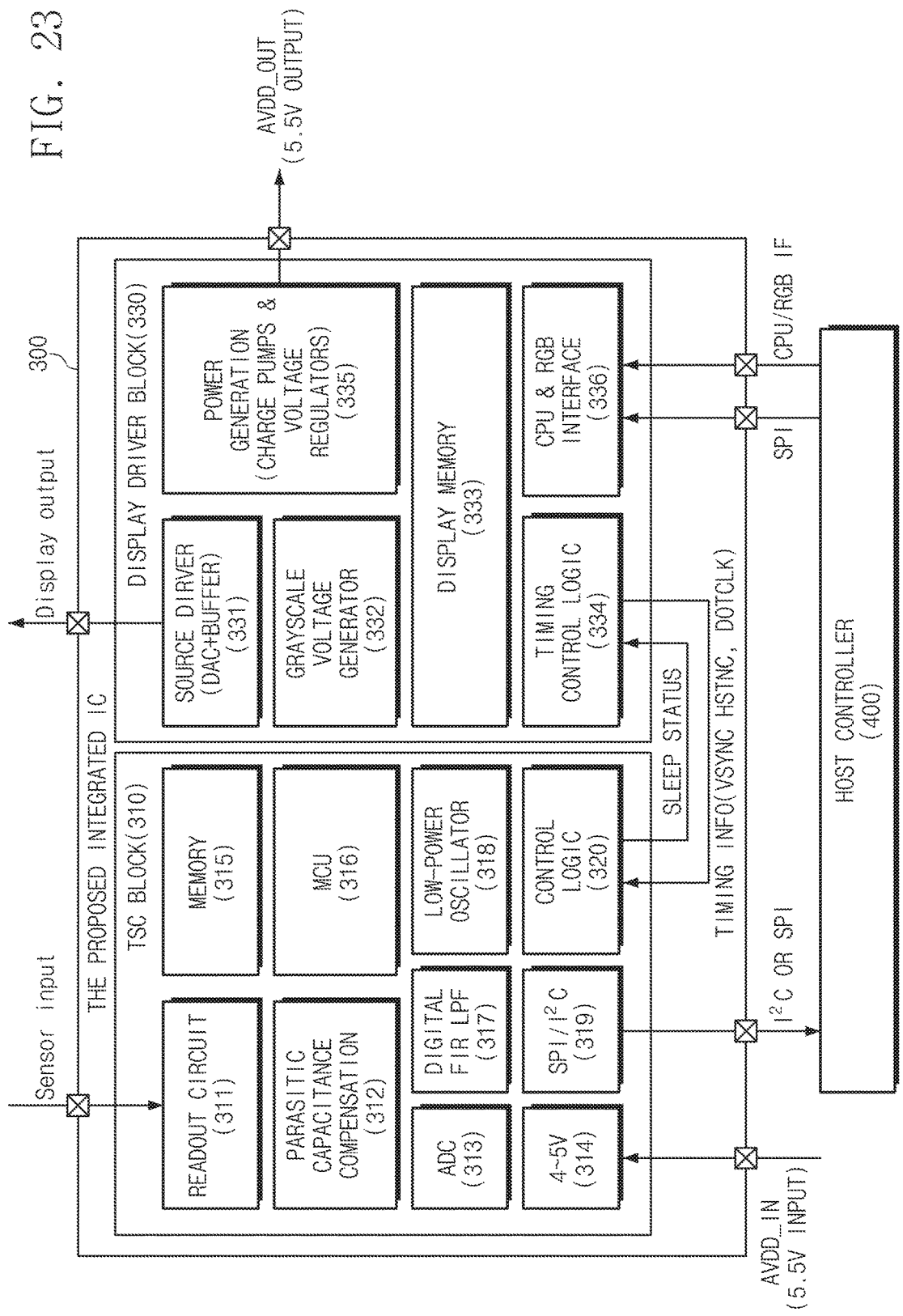

| TSC | Display | Power Generator | Timing information |
|---|---|---|---|
| Sleep | Sleep | Sleep | Off |
| Sleep | Normal | Normal | Off |
| Normal | Sleep | Sleep | On |
| Normal | Normal | Normal | On |

TOUCH DISPLAY DRIVING INTEGRATED CIRCUIT, OPERATION METHOD OF THE SAME, AND TOUCH DISPLAY DEVICE INCLUDING THE SAME

CROSS-REFERENCE TO RELATED APPLICATIONS

This application claims priority from Korean Patent Application No. 10-2016-0021887, filed on Feb. 24, 2016 and Korean Patent Application No. 10-2016-0055629, filed on May 4, 2016, in the Korean Intellectual Property Office, the disclosures of which are incorporated herein by reference in their entirety.

BACKGROUND

1. Field

Apparatuses and methods consistent with example embodiments relate to touch display driving integrated circuits, operation methods of the same, and touch display devices including the same.

2. Description of the Related Art

A display device includes a plurality of gate lines, a plurality of data lines, and a plurality of pixels. The pixels are connected to the gate lines and the data lines, respectively. The display device includes a gate driver integrated circuit (IC) configured to control each of the gate lines and a data driver IC configured to control each of the data lines. The gate driver IC provides a gate signal to each of the gate lines, and the data driver IC provides a data signal to each of the data lines.

With the recent trend toward compact user terminals, there has been development of an in-cell touch display device in which a display device and a touch panel are combined with each other. In a touch display device, an area occupied by a touch panel and a display panel is reduced by combining the touch panel with the display panel. However, the combination of the touch panel and the display panel causes problems depending on a driving manner. Accordingly, various driving manners have been developed to overcome these problems.

SUMMARY

One or more example embodiments provide touch display devices with improved reliability and improved performance and operation methods thereof.

According to an aspect of an example embodiment, there is provided a touch display driving integrated circuit (IC) including: a touch driver IC configured to be connected to touch electrodes through touch sensing lines, provide a sensing signal to first touch sensing lines among the touch sensing lines in a touch period, and apply a common voltage to second touch sensing lines among the touch sensing lines and apply a voltage different from the common voltage to third touch sensing lines different from the second touch sensing lines in a display period; and a source driver IC configured to be connected to pixels through data lines.

According to an aspect of another example embodiment, there is provided an operation method of a touch display driving integrated circuit (IC) configured to be connected to touch electrodes through touch sensing lines and to be connected to pixels through data lines. The operation method may include providing a sensing signal to first touch sensing lines among the touch sensing lines to perform a touch scan operation in a touch period, applying a common voltage to second touch sensing lines among the touch sensing lines and applying a voltage different from the common voltage to the other touch sensing lines in a display period, and providing a data signal to the data lines in the display period.

According to an aspect of another example embodiment, there is provided a touch display device including: a display panel including a plurality of touch electrodes and a plurality of pixels and a touch driver integrated circuit (IC) connected to the touch electrodes through touch sensing lines. The touch driver IC may perform a touch scan operation on first touch electrodes among the plurality of touch electrodes in a touch period. In a display period, the touch driver IC may apply a common voltage to second touch electrodes among the plurality of touch electrodes and apply a voltage different from the common voltage to the plurality of touch electrodes other than the second touch electrodes.

According to an aspect of another example embodiment, there is provided a touch display driving integrated circuit (IC) including: a touch driver IC configured to be connected to touch electrodes through touch sensing lines, provide a sensing signal to first touch sensing lines among the touch sensing lines in a touch period, and apply a common voltage to the first touch sensing lines before the touch period is terminated; and a source driver IC configured to be connected to pixels through data line.

According to an aspect of another example embodiment, there is provided an operation method of a touch display driving integrated circuit (IC) configured to be connected to touch electrodes through touch sensing lines and to be connected to pixels through data lines. The operation method may include providing a sensing signal to first touch sensing lines among the touch sensing lines in a touch period and providing the sensing signal to second touch sensing lines among the touch sensing lines and providing a common voltage to the first touch sensing lines in the touch period.

According to an aspect of another example embodiment, there is provided a touch display device including: a display panel including touch electrodes and pixels and a touch display driving integrated circuit (IC) configured to be connected to the touch electrodes through touch sensing lines. The touch display driving IC may perform a touch scan operation on the touch electrodes in a touch period and may apply a common voltage to touch electrodes on which the touch scan operation is completed before the touch period is terminated.

According to an aspect of another example embodiment, there is provided a touch display driving integrated circuit (IC) including: a plurality of pixels disposed in each of first to n-th areas, n being an integer greater than 1; a plurality of touch electrodes disposed in each of the first to n-th areas; a common voltage node configured to provide a common voltage for the plurality of pixels; and a touch driver IC configured to connect the common voltage node to the plurality of touch electrodes in the first area and apply a voltage different from the common voltage to the plurality of touch electrodes in the second to n-th areas while a data signal is applied to the plurality of the pixels in the first area.

BRIEF DESCRIPTION OF THE DRAWINGS

The above and other aspects will be more apparent by describing certain embodiments, with reference to the attached drawings, in which:

FIGS. 7 to 9 illustrate operation of the display device in FIG. 6;

FIG. 10 illustrates a touch area and a display area according to example embodiments;

FIGS. 13 to 16 illustrate the operation method described with reference to FIG. 12;

FIGS. 20 and 21 illustrate another operation method of the display device in FIG. 1;

FIG. 23 is a block diagram of an integrated circuit according to example embodiments;

DETAILED DESCRIPTION

Figure 1:
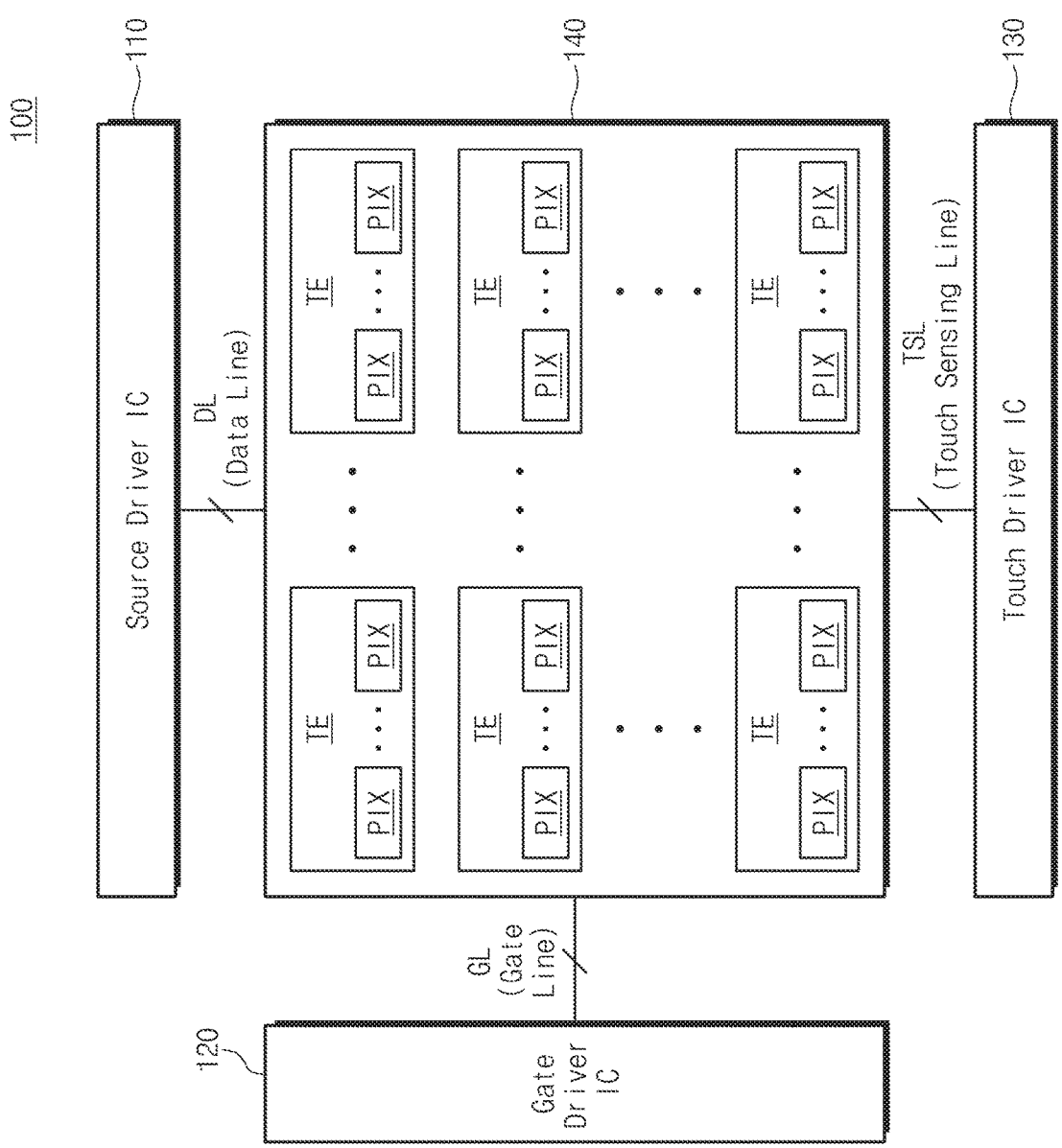
FIG. 1 is a block diagram of a display device according to example embodiments.

FIG. 1 is a block diagram of a display device 100 according to example embodiments. Referring to FIG. 1, the display device 100 may include a source driver integrated circuit (IC) 110, a gate driver IC 120, a touch driver IC 130, and a touch display panel 140. In example embodiments, the display device 100 may be a touch display device having a touch function. For example, the display device 100 may be an in-cell or on-cell touch display device.

The source driver IC 110 is connected to a plurality of pixels PIX of the display panel 140 through a plurality of data lines DL. For example, the display panel 140 includes a plurality of pixels PIX, which may be arranged in row directions and column directions. In example embodiments, pixels PIX arranged at the same column may share the same data line DL. The source driver IC 110 may be connected to the pixels PIX through the data lines DL and may control a voltage of the data lines DL to provide a data signal (or image signal) to each of the pixels PIX. Each of the pixels PIX may output (or display) image information in response to the received data signal.

The gate driver IC 120 may be connected to the pixels PIX through a plurality of gate lines GL. For example, pixels PIX arranged at the same row may be connected to the same gate line GL. The gate driver IC 120 may be connected to the pixels PIX through the gate lines GL and may control a voltage of the gate lines GL or provide a gate signal such that the data signal provided through the data lines may be provided to the pixels PIX.

In example embodiments, the source driver IC 110 and the gate driver IC 120 may receive control signals from a separate controller (e.g., a timing controller) and may operate in synchronization with the received control signals. For example, the control signal may include a vertical synchronization signal and a horizontal synchronization signal. The vertical synchronization signal may be a signal for making a distinction between frames to be output through the pixels PIX. The horizontal synchronization signal may be a signal for making a distinction rows corresponding to the data signal provided through the data lines DL. Thus, the horizontal synchronization signal may be a row distinction signal. In response to the control signal, the source driver IC 110 and the gate driver IC 120 may provide a data signal through a data line DL connected to the corresponding pixel PIX and may control a voltage of a gate line GL connected to a corresponding pixel PIX, respectively.

The touch driver IC 130 may be connected to a plurality of touch electrodes TE through a plurality of touch sensing lines TSL, respectively. For example, the touch display panel 140 may include a plurality of touch electrodes TE. The touch electrodes TE may be connected to different touch sensing lines TSL, respectively. In example embodiments, the touch electrode may be a transparent conductive layer such as indium tin oxide (ITO).

The touch driver IC 130 may control a voltage of the touch sensing lines TSL or provide a sensing signal to sense a user's touch that occurs at each of the touch electrodes TE. For example, when a user touches a body part (e.g., finger) on at least one of the touch electrodes TE, capacitance at the at least one touch electrode TE may vary depending on capacitance between the user's body part and the at least one touch electrode TE. The touch driver IC 130 may sense variation of the capacitance at the at least one touch electrode TE.

The touch driver IC 130 may identify that a user's touch occurs at a touch electrode TE where variation of capacitance is sensed. In example embodiments, the above-mentioned touch sensing manner is called a self-capacitance manner or a mutual-capacitance manner. However, the present example embodiments are not limited thereto and various changes or modifications of the touch sensing manner may be employed.

In example embodiments, the display panel 140 may include various display panels such as a liquid crystal display panel, an organic light emitting display panel, an electrophoretic display panel, and an electrowetting display panel. However, the touch display panel 140 is not limited to the above list and may be implemented using the above-mentioned display panels or other display panels. In example embodiments, the display device 100 including a liquid crystal display panel may further include a polarizer, a backlight unit, and the like.

In example embodiments, the pixels PIX may be divided into a plurality of groups depending on colors that the pixels display. The pixels PIX may display one of primary colors. The primary colors may include red, green, blue, and white. However, the primary colors are not limited to the above list and may further include various colors such as yellow, cyan, and magenta.

In example embodiments, the display panel 140 may be an in-cell touch display panel. The display panel 140 may include a plurality of pixels PIX and a plurality of touch electrode TE. The in-cell touch display panel may include a plurality of pixels PIX and a plurality of touch electrodes TE that are disposed on the same panel. The touch electrodes TE may be used as a common electrode of the pixels PIX. For example, each of the pixels PIX may output image information based on a difference between a data signal received through the data lines DL and a common voltage VCOM. In this case, the touch driver IC 130 may adjust voltage levels of the touch electrodes TE to the common voltage VCOM. The pixel PIX may compare the data signal received through the data line DL with the common voltage VCOM of the touch electrode TE and may output image information based on a result of the comparison. In example embodiments, a single touch electrode TE may have a larger area than a single pixel PIX. A single touch electrode TE may be used as a common electrode of one or more pixels PIX. In other words, a single touch electrode TE may correspond to one or more pixels PIX. In example embodiments, the common voltage VCOM may be a voltage of about −1.3 volt.

In example embodiments, the display device 100 may include at least one display period and at least one touch period while a single frame is output (i.e., during one period of a vertical synchronization signal). The display device 100 may display a part or the entirety of a single frame during at least one display period and may perform a touch scan operation on some of the touch electrodes TE during at least one touch period.

A predetermined signal (e.g., a sensing signal, a toggle signal or an active shield signal, and so on) may be provided to the touch electrodes TE such that a touch scan operation on the touch electrodes TE may be performed during at least one touch period. Since the touch electrode TE is used as a common electrode during at least one display period after the at least one touch period, the touch electrode TE may be adjusted to a level of the common voltage VCOM during the at least one display period. The display device 100 may repeatedly execute the display period and the touch period to display image information and sense a user's touch, respectively.

In example embodiments, the touch scan operation may indicate an active shield operation. The touch scan operation may indicate an operation to sense a user's touch with a touch electrode.

In example embodiments, as described above, when one touch period is terminated and the next display period is then executed in a driving manner in which a display period and a touch period are repeatedly executed, a common voltage VCOM may be provided to a plurality of touch electrode TE, respectively. In the case that the common voltage VCOM is simultaneously provided to all the touch electrodes TE, time required to set up the touch electrodes TE to the common voltage VCOM may increase. In this case, voltage comparison between a data line DL and a touch electrode TE (i.e., a touch electrode used as a common electrode) may not be normally performed in the next display period. Thus, a defect of an image information output (e.g., a horizontal line defect) may occur.

According to example embodiments, the display device 100 may apply the common voltage VCOM to some of the touch electrodes TE and may apply a voltage different from the common voltage VCOM to the other touch electrodes TE or float the other touch electrodes TE after the touch period is terminated. Since only some touch electrodes TE are applied with the common voltage VCOM, settling time required to stabilize the touch electrode TE at the common voltage VCOM may be reduced. Thus, normal image information may be output in the next display period. In example embodiments, some touch electrodes TE may indicate a common electrode TE corresponding to pixels that is to output image information in the next display period. Alternatively, some touch electrodes TE may indicate a common electrode TE included in an area in which image information is to be output in the next display period.

Figure 2:
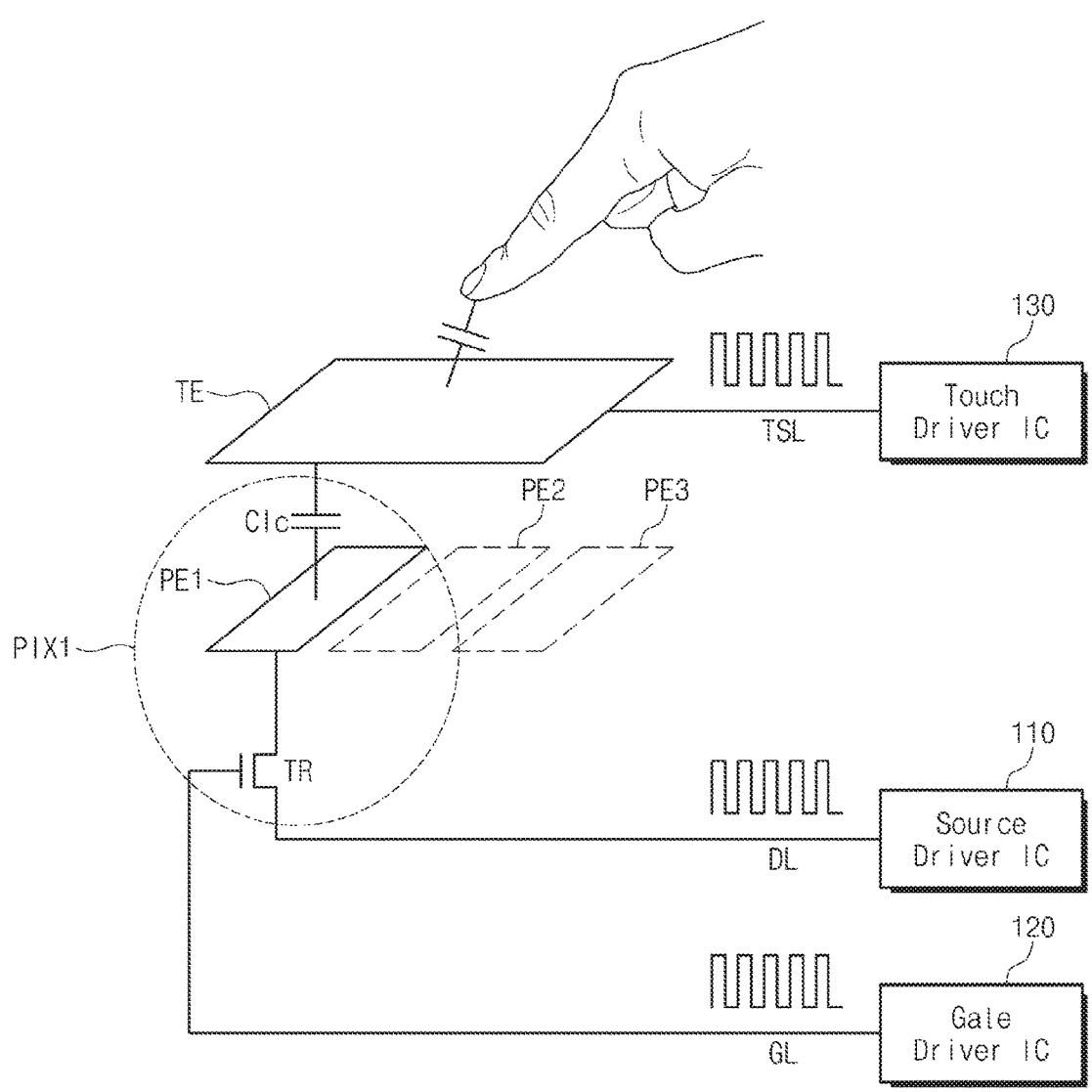
FIG. 2 illustrates a touch scan operation in a touch period of the display device in FIG. 1.

FIG. 2 illustrates a touch scan operation in a touch period of the display device in FIG. 1. For brevity of the drawing and description, components unnecessary to describe a touch scan operation of the display device 100 will be omitted.

Referring to FIGS. 1 and 2, a pixel PIX may include a pixel electrode PE and a transistor TR. In example embodiments, the transistor TR may be a thin film transistor. A source of the transistor TR is connected to the source driver IC 110 through a data line DL, a drain thereof is connected to the pixel electrode PE, and a gate thereof is connected to the gate driver IC 120 through a gate line GL. A liquid crystal layer may be disposed between the pixel electrode PE and the touch electrode TE, and a liquid crystal capacitor Clc may exist between the pixel electrode PE and the touch electrode TE. An electric field is formed by a voltage received through the data line DL according to the control of the source driver IC 110 and the gate driver IC 120. Arrangement of liquid crystal directors of the liquid crystal layer varies depending on the electric field. Light incident on the liquid crystal layer is passed or blocked according to the arrangement of the liquid crystal directors. Image information may be displayed based on the above-described operation of the pixel PIX.

In the touch period of the display device 100, the touch driver IC 130 may drive a touch sensing line TSL connected to the touch electrode TE. For example, the touch driver IC 130 may provide a sensing signal (or toggle signal) to the touch sensing line TSL. When a user's body part touches or approaches the touch electrode TE, a signal of the touch sensing line TSL may be changed by capacitance between the touch electrode TE and the user's body part. The touch driver IC 130 may sense signal change of the touch sensing line TSL and may recognize the user's touch based on the sensing of the signal change.

In example embodiments, a parasitic capacitor may exist between the touch sensing line TSL, the touch electrode TE, the pixel electrode PE, the data line DL, the gate line GL, other pixel electrodes PE2 and PE3, and so on. In the touch period of the display device 100, the source driver IC 110 and the gate driver IC 120 may provide a sensing signal to the data line DL and the gate line GL, respectively to cancel an effect of the above-mentioned parasitic capacitor. As the same signals are provided to the touch sensing line TSL, the data line DL, and the gate line GL, an effect due to the above-mentioned parasitic capacitor may be cancelled. Thus, capacitance variation depending on the user's touch may be easily sensed.

In example embodiments, as shown in FIG. 2, a single touch electrode TE may be disposed on a plurality of pixel electrodes PE. For example, as described with reference to FIG. 1, the touch electrode TE may be used as a common electrode in a display period. That is, in the display period, image information may be displayed based on a difference in voltage between the single touch electrode TE used as the common electrode and the pixel electrodes PE1, PE2, and PE3. The arrangement and the configuration of the pixel electrodes PE1 to PE3 and the touch electrode TE shown in FIG. 2 are merely exemplary, and example embodiments are not limited thereto. One or more touch electrodes may be disposed on a plurality of pixel electrodes arranged in various fashions.

Figure 3:
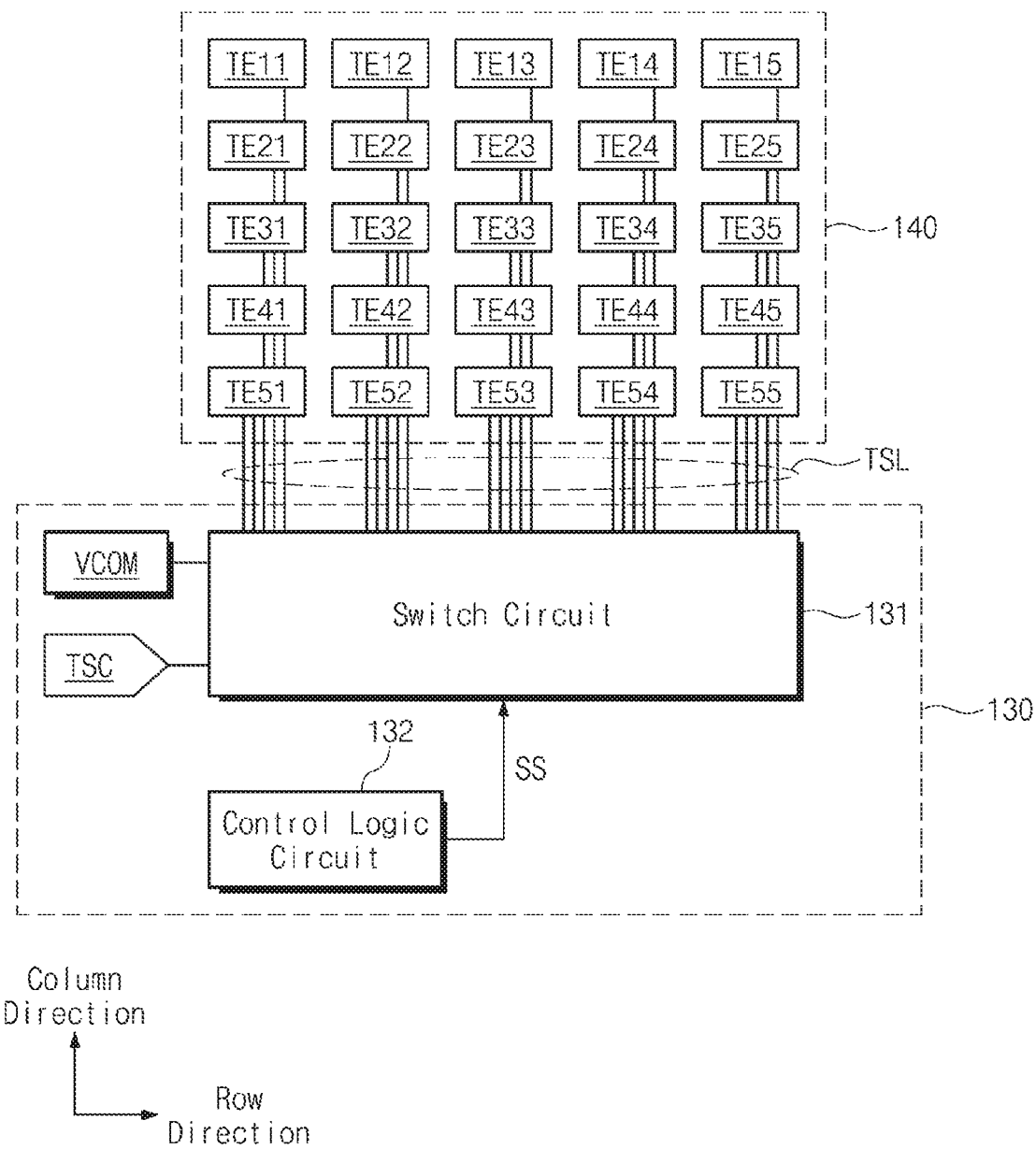
FIG. 3 illustrates a touch driver IC in FIG. 1.

FIG. 3 illustrates the touch driver IC 130 in FIG. 1. For brevity of description, components unnecessary to describe the configuration of the touch driver IC 130 will be omitted.

It will be assumed that the touch display panel 140 includes 5×5 touch electrodes TE11 to TE55. For brevity of the drawing, pixels are omitted. However, example embodiments are not limited thereto and touch electrodes and pixels may be arranged in various fashions.

Referring to FIGS. 1 and 3, the display panel 140 includes a plurality of touch electrodes TE1 to TE55. The touch electrodes TE1 to TE55 may be arranged in a row direction and a column direction. The touch electrodes TE11 to TE55 are connected to different touch sensing lines TSL, respectively.

The touch driver IC 130 includes a switching circuit 131, a control logic circuit 132, and a touch sensing circuit TSC. The switching circuit 131 is connected to the touch electrodes TE11 to TE55 through the touch sensing lines TSL, respectively. The switching circuit 131 may drive the touch sensing lines TSL in response to a switching signal SS from the control logic circuit 132. For example, in response to the switching signal SS from the control logic circuit 132, the switching circuit 131 may connect corresponding touch sensing lines among the touch sensing lines TSL with a common voltage (VCOM) node to provide at least some of the touch electrodes TE1 to TE55 with the common voltage VCOM. Alternatively, in response to the switching signal SS from the control logic circuit 132, the switching circuit 131 may connect corresponding touch sensing lines among the touch sensing lines TSL with the touch sensing circuit TSC to perform a touch scan operation on at least some of the touch electrodes TE11 to TE55.

The control logic circuit 132 may generate the switching signal SS. For example, in the display period of the display device 100, the control logic circuit 132 may generate the switching signal SS such that the common voltage VCOM is applied to touch electrodes included in an area to be displayed. In the touch period of the display device 100, the control logic circuit 132 may generate the switching signal SS such that touch electrodes included in an area in which a touch scan operation is to be performed are connected to the touch sensing circuit TSC.

In example embodiments, the control logic circuit 132 may generate a switching signal for each of the touch sensing lines TSL or each of the touch electrodes TE11 to TE55. That is, the switching circuit 131 may independently control the touch sensing lines TSL in response to the switching signal SS.

Alternatively, the control logic circuit 132 may divide the touch sensing lines TSL into a plurality of groups based on areas displayed in the display period and areas in which a touch scan operation is performed in the touch period and may generate a switching signal SS based on the plurality of groups. That is, the switching circuit 131 may control the touch sensing lines TSL in units of the divided groups in response to the switching signal SS.

Figure 4:
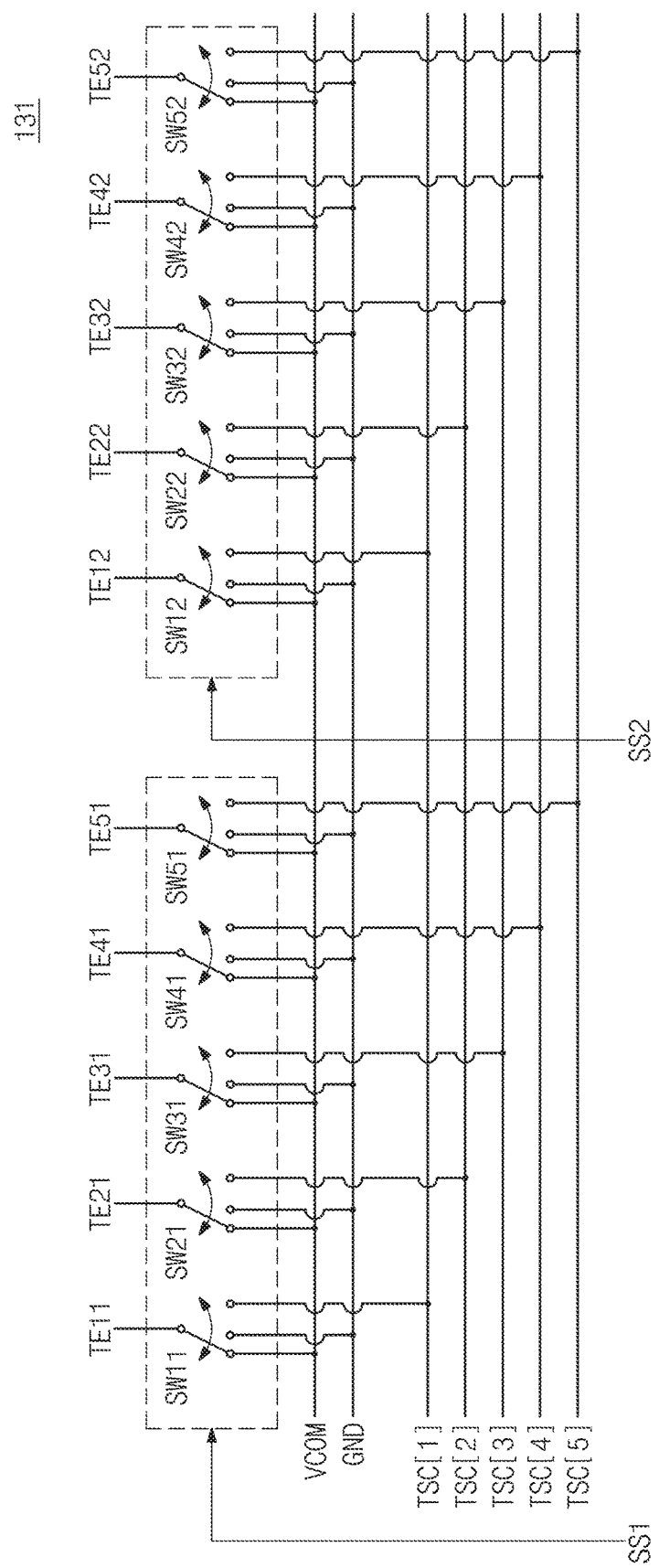
FIG. 4 is a circuit diagram of a switching circuit in FIG. 3.

FIG. 4 is a circuit diagram of the switching circuit 131 in FIG. 3. For brevity of description and drawing, some components of the switching circuit 131 are shown in FIG. 4. For brevity of description, it will be described that a touch sensing circuit TSC includes first to fifth sensing circuits TSC[1] to TSC[5]. Each of the first to fifth touch sensing circuits TSC[1] to TSC[5] may be connected to one of touch electrodes and may be configured to determine whether a user touches with the one of touch electrodes. However, example embodiments of inventive concepts are not limited thereto.

Referring to FIGS. 3 and 4, the switching circuit 131 may include a plurality of switches SW11, SW21, SW31, SW41, SW51, SW12, SW22, SW32, SW42, and SW52. Each of the switches SW11, SW21, SW31, SW41, SW51, SW12, SW22, SW32, SW42, and SW52 may be connected to a corresponding one of the touch electrodes TE11, TE21, TE31, TE41, TE51, TE12, TE22, TE32, TE42, and TE52, and may switch among a common voltage VCOM, a ground voltage GND, and a corresponding one of the touch sensing circuits TSC[1] to TSC[5] in response to switching signals SS1 and SS2.

For example, the switch SW11 may be configured to connect the touch electrode TE1 to one of the common voltage VCOM, the ground voltage GND, and the first touch sensing circuit TSC[1]. The switch SW21 may be configured to connect the touch electrode TE21 to one of the common voltage VCOM, the ground voltage GND, and the second touch sensing circuit TSC[2]. The switch SW31 may be configured to connect the touch electrode TE31 to one of the common voltage VCOM, the ground voltage GND, and the third touch sensing circuit TSC[3]. The switch SW41 may be configured to connect the touch electrode TE41 to one of the common voltage VCOM, the ground voltage GND, and the fourth touch sensing circuit TSC[4]. The switch SW51 may be configured to connect the touch electrode TE51 to one of the common voltage VCOM, the ground voltage GND, and the fifth touch sensing circuit TSC[5].

That is, as described above, the plurality of touch electrodes TE11 to TE55 may be connected to a plurality of switches, respectively and the plurality of switches may drive the plurality of touch electrodes TE11 to TE55 in response to a switching signal, respectively.

In example embodiments, touch scan operations may be simultaneously performed on the touch electrodes TE11 to TE51 (e.g., touch electrodes of the same column). In this case, the touch electrodes TE11 to TE51 may be connected to the first to fifth touch sensing circuits TSC[1] to TSC[5], respectively and the first to fifth touch sensing circuits TSC[1] to TSC[5] may determine whether the user touches the touch electrodes TE11 to TE51, respectively. In example embodiments, when that the touch scan operations are performed on the touch electrodes TE11 and TE51, the touch electrodes TE12 to TE52 may be connected to a node of the ground voltage GND, the common voltage VCOM or a separate voltage, or may be floated.

Switches (e.g., SW11 to SW51) corresponding to touch electrodes (e.g., TE11 to TE51) disposed on the same column (e.g., a first column) may operate in response to a single switching signal (e.g., the first switching signal SS1). In addition, switches (e.g., SW12 to SW52) corresponding to touch electrodes (e.g., TE12 to TE52) disposed on the same column (e.g., a second column) may operate in response to a single switching signal (e.g., the second switching signal SS2). For example, the switches SW11 to SW51 may connect the touch electrodes TE11 to TE51 with the common voltage (VCOM) node, the ground voltage (GND) node or a corresponding touch sensing circuit TSC in response to the first switching signal SS1, respectively. In addition, the switches SW12 to SW52 may connect the touch electrodes TE12 to TE52 to the common voltage (VCOM) node, the ground voltage (GND) node or a corresponding touch sensing circuit TSC in response to the second switching signal SS2, respectively.

However, the above-described configuration or the configuration shown in FIG. 4 is merely exemplary, and touch electrodes and switches may be grouped in a row direction, a column direction or column and row directions according to an area in which a touch scan operation is performed or an area in which image information is displayed. In other words, switches corresponding to touch electrodes (e.g., TE11 to TE15 in FIG. 3) disposed on the same row may operate in response to a single switching signal. Alternatively, switches corresponding to touch electrodes (e.g., TE11, TE12, TE21, and TE22) disposed in a specific area may operate in response to a single switching signal. Alternatively, a plurality of switches may independently operate by different switching signals, respectively.

A plurality of switches may be connected to different voltage nodes other than voltage nodes shown in FIG. 4, respectively. For example, nodes of a global voltage VGLOBAL, a reference voltage, and a specific voltage different from the common voltage VCOM may be further connected to the plurality of switches.

Figure 5:
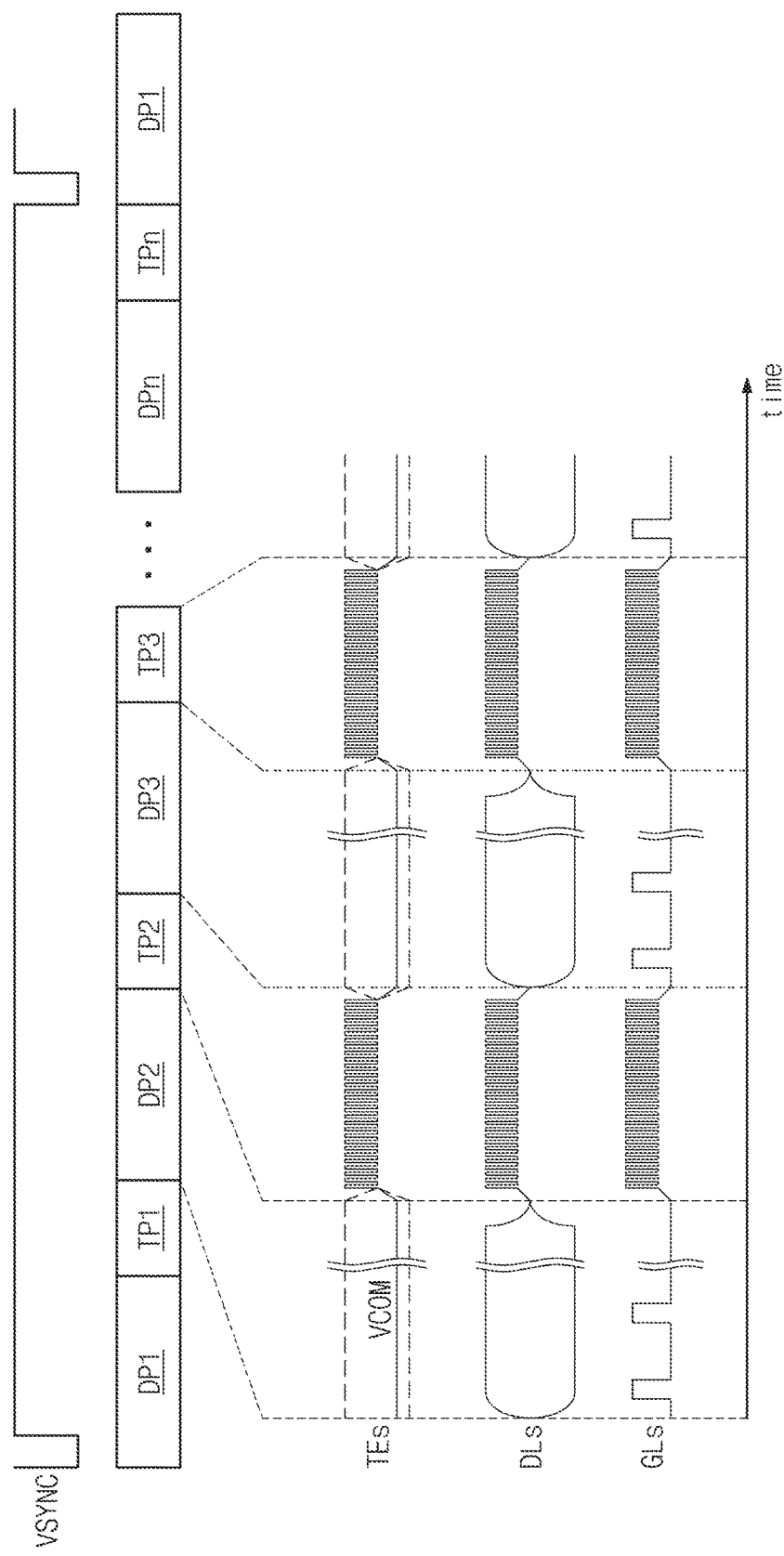
FIG. 5 is a timing diagram illustrating operation of the display device in FIG. 1.

FIG. 5 is a timing diagram illustrating operation of the display device 100 in FIG. 1. For ease of description, it will be assumed that the term "area" indicates a specific area defined on a plane of the display panel 140. Additionally, an area in which image information is displayed in a single display period DP will be referred to as a "display area". During a single display period DP, image information may be output or displayed by pixels included (or disposed) in a display area.

Additionally, a target area of a touch scan operation in a single touch period TP will be referred to as a "touch area". During a single touch period TP, a touch scan operation may be performed by touch electrodes included in a touch area.

That is, the display panel 140 may be divided into a plurality of display areas. Additionally, the display panel 140 may be divided into a plurality of touch areas. Each of the display areas and each of the touch areas may be identical to each other or different from each other. However, example embodiments of inventive concepts are not limited thereto.

Referring to FIGS. 1, 2, 3, and 5, a plurality of display periods DP1 to DPn and a plurality of touch periods TP1 to TPn may alternately exist during one cycle of the vertical synchronization signal VSYNC. In each of the display periods DP1 to DPn, the display device 100 may perform a partial frame display operation to output image information of a partial area among a single image frame through the display panel 140. For example, in the first display period DP1, the display device 100 may output partial image information of a single frame through a first display area. In the second display period DP2, the display device 100 may output another partial image information of the single frame through a second display area. In the third to $n^{th}$ display periods DP3 to DPn, the display device 100 may output the other image information of the single frame. That is, the display device 100 may sequentially or non-sequentially output image information in the plurality of display periods DP1 to DPn included in one cycle of the vertical synchronization signal VSYNC to output image information on the single frame during one cycle of the vertical synchronization signal VSYNC.

The display device 100 may perform a touch scan operation in a touch period TP between display periods DP. For example, the first touch period TP1 may exist between the first and second display periods DP1 and DP2. During the first touch period TP1, the display device 100 may perform a touch scan operation on the first touch area. The second touch period TP2 may exist between the second and third display periods DP2 and DP3. During the second touch period TP2, the display device 100 may perform a touch scan operation on the second touch area. Similarly, the display device 100 may perform a touch scan operation on a corresponding touch area in each of the third to $n^{th}$ touch periods TP3 to TPn. As a result, the display device 100 may perform a touch scan operation on all areas of the display panel 140 in one cycle of the vertical synchronization signal VSYNC.

As described above, a plurality of display periods and a plurality of touch periods exist alternately during one cycle of the vertical synchronization signal VSYNC. The display device 100 may display image information on a corresponding display area in each of the display periods DP1 to DPn.

As described with reference to FIG. 2, the touch electrode TE is used as a common electrode during a display period. That is, the common voltage VCOM may be provided to the touch electrode TE during the display period. The display device 100 may provide the common voltage VCOM to a touch electrode included in a corresponding display area in the display period, and may float or may provide a voltage different from the common voltage VCOM (e.g., a ground voltage GND or a specific voltage) to other touch electrodes.

For example, during the second display period DP2, the display device 100 may display image information on the second display area. At this point, the source driver IC 110 may provide image data to pixels included in the second display area through a plurality of data lines DLs and the gate driver IC 120 may provide a gate signal to a plurality of gate lines GLs. The touch driver IC 130 may apply the common voltage VCOM to touch electrodes TE included in the second display area and may apply a voltage different from the common voltage VCOM to the other touch electrodes TE.

During the second touch period, the source driver IC 110 and the gate driver IC 120 may provide a sensing signal (or toggle signal) to the data lines DLs and the gate lines GLs, respectively and the touch driver IC 130 may provide a sensing signal (or toggle signal) to touch electrodes included in a corresponding touch area, thereby a touch scan operation on a corresponding touch area may be performed. In example embodiments, the sensing signal may be a toggle signal at a constant level, and may be used as a signal for determining whether there is a user's touch in a touch period.

In the third display period DP3, the display device 100 may display image information on a third display area. At this point, the touch driver IC 130 may apply the common voltage VCOM to touch electrodes TE included in the third area and may apply a voltage different from the common voltage VCOM to the other touch electrodes.

In example embodiments, in the display periods shown in FIG. 5, the voltage applied to the touch electrodes TE may be the common voltage VCOM or a voltage different from the common voltage VCOM. In FIG. 5, since the voltage applied to the touch electrodes TE is not limited to the common voltage VCOM, the voltage applied to the touch electrodes TE is indicated by dotted lines. However, example embodiments are not limited thereto.

In example embodiments, when a touch period is terminated and all the touch electrodes TE are simultaneously applied with the common voltage VCOM, the touch electrodes TE may not normally reach the common voltage VCOM at a start point of a display period. In this case, a problem such as horizontal line defect may occur in the beginning of the display period. However, as described above, settling time taken for touch electrodes included in a corresponding display area to reach the common voltage VCOM is reduced by applying the common voltage VCOM to the touch electrodes included in the corresponding display area and applying a voltage different from the common voltage VCOM to the other touch electrodes in a display period of the display device. Thus, the problem such as horizontal line defect may be suppressed.

Figure 6:
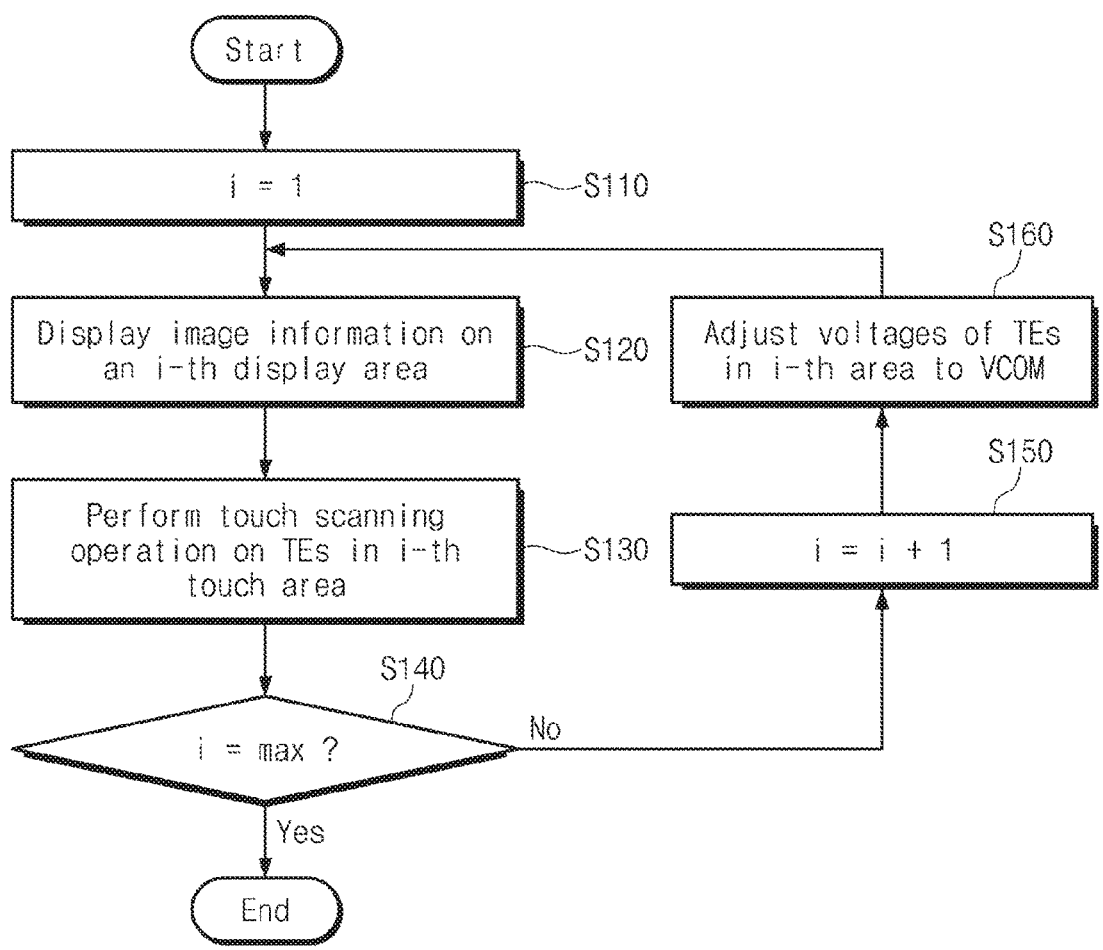
FIG. 6 is a flowchart summarizing an operation method of the display device in FIG. 1.

FIG. 6 is a flowchart for summarizing an operation method of the display device 100 in FIG. 1. In example embodiments, an operation of the display 100 performed during one cycle of a vertical synchronization signal VSYNC will now be described with reference to FIG. 6. That is, the display device 100 may output a single frame and perform a touch scan operation on all areas of the display panel 140 through the operations of the flowchart shown in FIG. 6.

Referring to FIGS. 1 and 6, in a step S110, a variable i is set to 1. In example embodiments, the variable i is a reference numeral for explaining a repeated operation of a display period and a touch period according to example embodiments and is not intended to indicate a specific component.

In a step S120, the display device 100 may display image information on an $i^{th}$ display area. For example, the display device 100 may control a voltage of a data line DL and a gate line GL to display image information on pixels PIX included in the $i^{th}$ display area. In example embodiments, touch electrodes included in the $i^{th}$ display area may have a voltage level of the common voltage VCOM.

In a step S130, the display device 100 may perform a touch scan operation on an $i^{th}$ touch area. For example, the display device 100 may provide a sensing signal to touch electrodes TE included in the $i^{th}$ touch area and may determine whether a user touches each of the touch electrodes TE included in the $i^{th}$ touch area, based on variation of the sensing signal.

In a step S140, a determination is made as to whether the variable i is maximum. This means that when the variable i is maximum, a single frame is displayed by the display device 100.

When the variable i is not maximum (e.g., there is a touch area in which a touch scan operation is not performed or a display area in which image information is not displayed), the variable i increases to i+1 in a step S150.

In a step S160, the display device 100 adjusts a voltage of touch electrode TE included in an $i^{th}$ display area (i.e., a display area in which image information is to be displayed in the next display area) to the common voltage VCOM. For brevity of description, the display area in which image information is to be displayed in the next display area will be referred to as a "next display area". For example, the touch driver IC 130 may connect touch sensing lines connected to touch electrodes included in the next display area with a common voltage (VCOM) node. In this case, voltages of the touch electrodes TE included in the next display may become the common voltage VCOM.

In example embodiments, the touch driver IC may float or connect touch sensing lines connected to electrodes other than the touch electrodes TE included in the next display area with a node of a voltage different from the common voltage VCOM (e.g., a ground voltage GND or a specific voltage). That is, by connecting only some touch electrodes (e.g., some touch electrodes including the touch electrodes included in the next display area) with the common voltage (VCOM) node, voltage of touch electrodes may be set up to the common voltage VCOM at higher speed than all the touch electrodes TE are connected to the common voltage (VCOM) node.

Then the display device 100 may repeatedly perform the operations of the step S120 to the step S160.

As described above, a plurality of display periods and a plurality of touch periods exist during one cycle of the vertical synchronization signal VSYNC. The display device 100 performs an image information display operation and a touch scan operation in each of the display periods and the touch periods. At this point, the display device 100 may complete the touch scan operation, and then float or apply a voltage different from the common voltage VCOM (e.g., ground voltage GND or specific voltage) to the other touch electrodes, thereby setup speed of the touch electrodes TE included in the next display area can be improved. Thus, when image information is displayed on the next display area, a horizontal line defect is eliminated.

Figure 8:
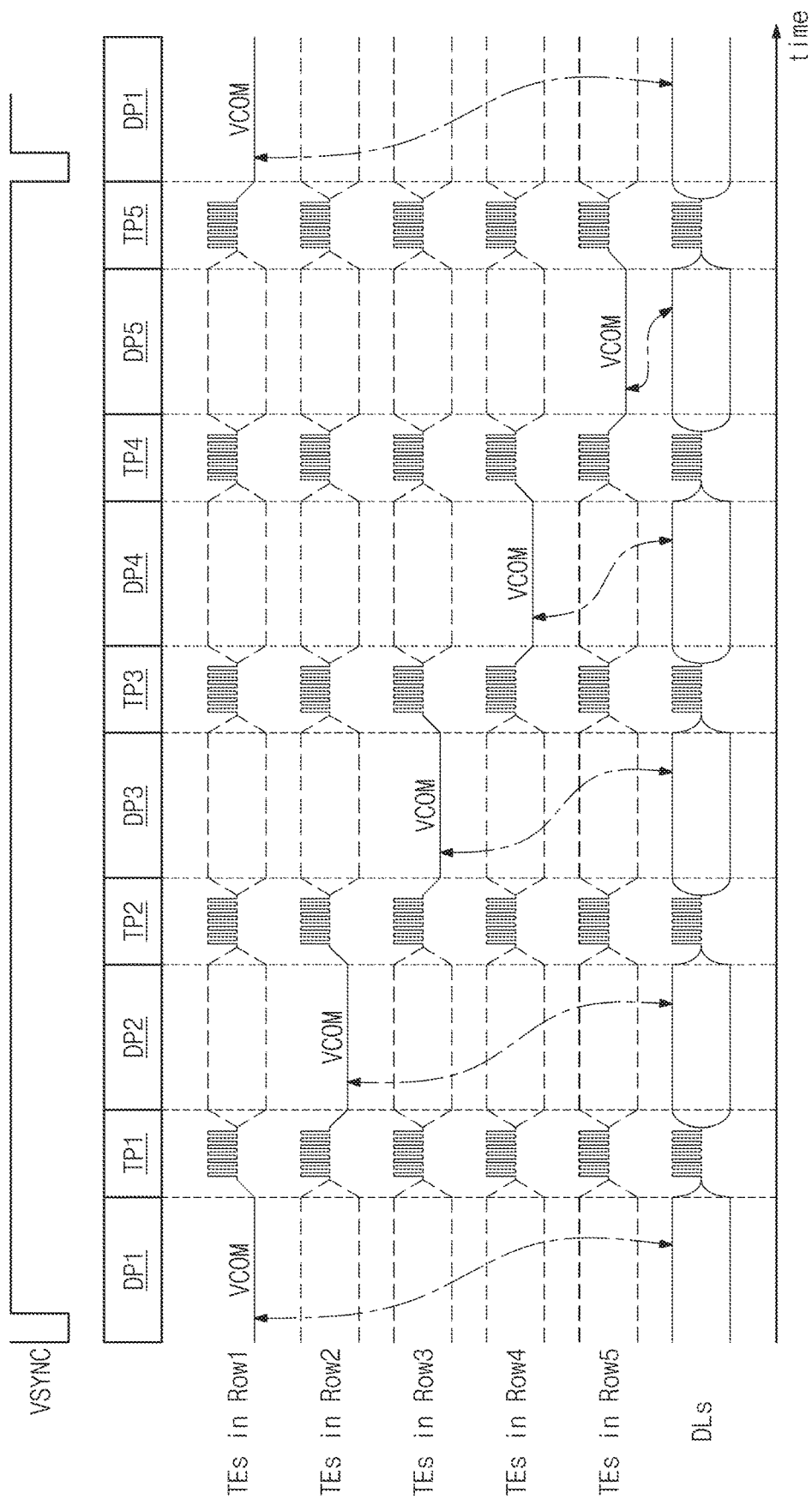
Figure 9:
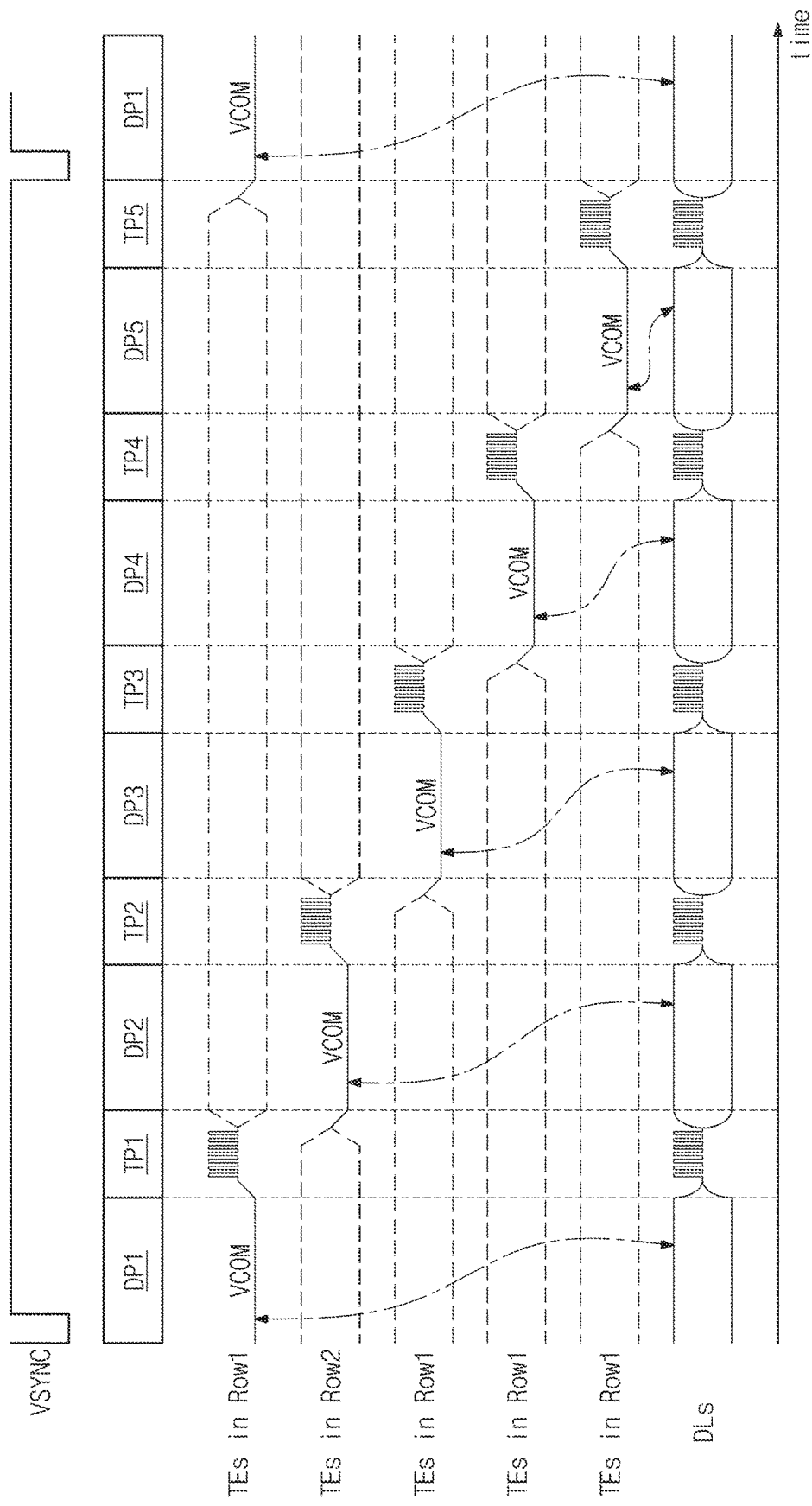

FIGS. 7 to 9 illustrate operation of the display device 100 in FIG. 6. For brevity of drawings and ease of description, components unnecessary to describe example embodiments of inventive concepts will be omitted.

For example, referring to FIGS. 1 and 7, it will be assumed that the display panel 140 of the display device 100 includes 5×5 touch electrodes TE1 to TE55 arranged in a row direction and a column direction. As described above, the display panel 140 may include a plurality of pixels and each of the pixels may be connected to a plurality of data lines DL and a plurality of gate lines GL and may display image information according to the control of the source driver IC 110 and the gate driver IC 120. The pixels may be disposed to overlap the touch electrodes TE1 and TE55, respectively.

It will be assumed that a display area and a touch area are divided in a row direction. That is, the display device 100 may perform a display operation and a touch scan operation by row units. For example, touch electrodes TE11 to TE15 may form a first row ROW1. Touch electrodes TE21 to TE25 may form a second row ROW2. Touch electrodes TE31 to TE35 may form a third row ROW3. Touch electrodes TE41 to TE45 may form a fourth row ROW4. Touch electrodes TE51 to TE55 may form a fifth row ROW5. Each of the first to fifth rows ROW1 to ROW5 may be defined by a display area and a touch area.

The display device 100 may output corresponding image information through pixels included in the first row ROW1 and then may perform a touch scan operation on the touch electrodes TE11 to TE15 included in the first row ROW1. Similarly, the display device 100 may sequentially perform a display operation and a touch scan operation on each of the second to fifth rows ROW2 to ROW5.

In example embodiments, the configuration of the display area, the configuration of the touch area, the configuration of the touch electrodes, the order of the display operation, and the order of the touch scan operation described with reference to FIG. 7 are merely exemplary to facilitate the understanding of example embodiments without being limited thereto.

Hereinafter, operation of a display device 100 according to example embodiments will now be described based on the configuration described with reference to FIG. 7. Referring to FIG. 1 and FIGS. 7 to 9, horizontal axes of graphs in FIGS. 8 and 9 indicate time. The display device 100 may display a single frame during one cycle of a vertical synchronization signal VSYNC.

The first to fifth display periods DP1 to DP5 and the first to fifth touch periods TP1 to TP5 may be included in one cycle of the vertical synchronization signal VSYNC. As shown in FIGS. 8 and 9, the first to fifth display periods DP1 to DP5 and the first to fifth touch periods TP1 to TP5 may be disposed alternately.

For example, the display device 100 may output image information through pixels included in the first row ROW1 during the first display period DP1. And then, the display device 100 may perform a touch scan operation on the touch electrodes TE11 to TE15 included in the first row ROW1 during the first touch period TP1. The display device 100 may output image information through pixels included in the second row ROW2 during the second display period DP2. The display device 100 may perform a touch scan operation on the touch electrodes TE21 to TE25 included in the second row ROW2 during the second touch period TP2. The display device 100 may output image information through pixels included in the third row ROW3 during the third display period DP3. The display device 100 may perform a touch scan operation on the touch electrodes TE31 to TE35 included in the third row ROW3 during the third touch period TP3. The display device 100 may output image information through pixels included in the fourth row ROW4 during the fourth display period DP4. The display device 100 may perform a touch scan operation on the touch electrodes TE41 to TE45 included in the fourth row ROW4 during the fourth touch period TP4. The display device 100 may output image information through pixels included in the fifth row ROW5 during the fifth display period DP5. The display device 100 may perform a touch scan operation on the touch electrodes TE51 to TE55 included in the fifth row ROW5 during the fifth touch period TP5.

In example embodiments, display areas in the first to fifth display periods DP1 to DP5 may be different from each other. The display device 100 applies the common voltage VCOM to touch electrodes TE included in display areas respectively corresponding to the first to fifth display periods DP1 to DP5 and may apply a voltage different from the common voltage VCOM to the other touch electrodes TE.

For example, as shown in FIG. 8, the display device 100 displays image information on pixels included in the first row ROW1 during the first display period DP1. That is, the first row ROW1 may be a first display area corresponding to the first display period DP1. The display device 100 applies the common voltage VCOM to touch electrodes (e.g., TE11 to TE15) included in the first row ROW1 (i.e., the first display area). At this point, the display device 100 may apply a voltage different from the common voltage VCOM to the touch electrodes TE21 to TE55 included in different areas (i.e., the second to fifth rows ROW2 to ROW5). The different voltage may be a specific voltage different from the common voltage VCOM or a ground voltage GND. Alternatively, the display device 100 may float touch sensing lines TSL connected to the touch electrodes TE21 to TE55 included in different areas (i.e., the second to fifth rows ROW2 to ROW5). In example embodiments, the above-mentioned different voltage is not limited to some voltage levels and thus is indicated in FIGS. 8 and 9 by dotted lines.

During the first display period DP1, the touch electrodes (e.g., TE1 to TE15) included in the first row ROW1 (i.e., the first display area) may have a voltage level of the common voltage VCOM and a plurality of pixels included in the first row ROW1 may display image information based on a data signal provided through data lines DLs and a voltage between the touch electrodes TE11 to TE15 having the common voltage VCOM.

During the first touch period TP1, the display device 100 performs a touch scan operation on the touch electrodes (e.g., TE11 to TE15) included in the first row ROW1. At this point, the display device 100 may provide a sensing signal (e.g., a toggle signal) to each of the touch electrodes TE11 to TE55, as shown in FIG. 8. Alternatively, the display device 100 may provide a sensing signal to the touch electrodes TE11 to TE15 included in the first row ROW1 (i.e., the first touch area) and may not provide the sensing signal to the touch electrodes included in the second to fifth rows ROW2 to ROW5 when a touch scan operation is performed, as shown in FIG. 9.

In example embodiments, during a touch period, a sensing signal may be provided to all or a part of data lines DL and all or a part of gate lines GL to cancel or compensate an influence caused by a parasitic capacitor in the display panel 140. Alternatively, a sensing signal may be provided to data lines DL corresponding to a touch electrode where a touch scan operation is to be performed, among the plurality of data lines DL. Alternatively, a sensing signal may be provided to a gate line GL corresponding to a touch electrode where a touch scan operation is to be performed, among the plurality of gate lines GL.

After the first touch period TP1, the display device 100 may display image information on the pixels included in the second row ROW2 in the second display period DP2. At this point, as described above, the display device 100 applies the common voltage VCOM to the touch electrodes TE21 to TE25 included in the second row ROW2 and applies a voltage different from the common voltage VCOM to other touch electrodes (e.g., TE1 to TE15 and TE31 to TE55). The pixels included in the second row ROW2 may output the image information based on the data signal received through the data line DL and the voltage level of the touch electrodes TE21 to TE25 included in the second row ROW2 (i.e., the common voltage VCOM).

Similarly, after the second display period DP2 is terminated, the display device 100 may perform a touch scan operation on the touch electrodes TE21 to TE25 included in the second row ROW2 in the second touch period TP2. At this point, similar to the above description, the display device 100 may provide a sensing signal (e.g., toggle signal) to each of the touch electrodes TE1 to TE55. Alternatively, as shown in FIG. 9, the display device 100 may provide a sensing signal to the touch electrodes TE21 to TE25 included in the second row where a touch scan operation is to be performed (i.e., the second touch area) and may not provide the sensing signal to touch electrodes included in the first row ROW1 and the third to fifth rows ROW3 to ROW5.

As described above, the display device 100 may display image information on pixels included in a corresponding display area in each of the third to fifth display periods DP3 to DP5 and may perform a touch scan operation on touch electrodes included in a corresponding touch area in each of the third and fifth touch periods TP3 to TP5. In each display period, the display device 100 may apply the common voltage VCOM to touch electrodes included in a corresponding display area and may apply a voltage different from the common voltage VCOM to other touch electrodes. Thus, since the touch electrodes included in the display device can be rapidly set up to the common voltage VCOM, a problem such as a horizontal line defect is suppressed.

In example embodiments, the timing diagrams shown in FIGS. 8 and 9 are merely exemplary to facilitate the understanding of some example embodiments without being limited thereto. For example, in a display period, a common voltage may be applied to touch electrodes included in a display area as well as an area adjacent to the display area. For example, in the case that the display area is the second row ROW2, an adjacent area may indicate the first row ROW1 or the third row ROW3. That is, in the display area, the display device 100 may apply the common voltage VCOM to touch electrodes included in a partial area (not the entire area) including the display area among the entire area of the display panel 140 and may float or apply a voltage different from the common voltage VCOM (e.g., a ground voltage GND or a specific voltage) to the other touch electrodes.

In a touch period TP, the display device 100 may provide a sensing signal to some of the data lines DL and may provide the sensing signal to some of the gate lines GL. For example, in the second touch period TP2, a touch scan operation may be performed on the touch electrodes TE21 to TE25 included in the second row ROW2. At this point, the display device 100 may provide a sensing signal to data lines DL and gate lines GL connected to pixels corresponding to the touch electrodes TE21 to TE25 (i.e., pixels included in the second row ROW2). The display device 100 may not provide the sensing signal to data lines DL and gate lines GL connected to other pixels (i.e., pixels other than the pixels included in the second row ROW2).

The above descriptions are merely exemplary, and various changes or modifications may be employed without departing from inventive concepts.

FIG. 10 illustrates another example of a touch area and a display area according to example embodiments. For brevity of the drawing, components unnecessary to describe the display area and the touch area will be omitted.

Referring to FIG. 10, a display panel 140 includes a plurality of touch electrodes TE1 to TE55. As described above, each of the touch electrodes TE1 to TE55 is used as a common electrode during a display period and as a touch electrode for a touch scan operation during a touch period. In example embodiments, the display panel 140 may include a plurality of pixels PIX (see FIGS. 1 and 2) and may display image information on the pixels PIX.

In the above-described embodiments, it has been described that display areas are identical to touch areas, respectively. However, example embodiments are not limited thereto. In the display panel 140 of the display device 100 according to example embodiments, a plurality of touch areas may be different from a plurality of display areas, respectively.

As shown in FIG. 10, the display panel 140 may be divided into first to fifth touch areas TA01 to TA05. Also the display panel 140 may be divided into first to fifth display areas DA01 to DA05. For example, the first touch areas TA01 may include touch electrodes TE11 to TE51 disposed in the same column, the second touch areas TA02 may include touch electrodes TE12 to TE52 disposed in the same column, the third touch areas TA03 may include touch electrodes TE13 to TE53 disposed in the same column, the fourth touch areas TA04 may include touch electrodes TE14 to TE54 disposed in the same column, and the fifth touch areas TA05 may include touch electrodes TE15 to TE55 disposed in the same column.

The first display area DA01 may include touch electrodes TE11 to TE15 disposed in the same row, the second display area DA02 may include touch electrodes TE21 to TE25 disposed in the same row, the third display area DA03 may include touch electrodes TE31 to TE35 disposed in the same row, the fourth display area DA04 may include touch electrodes TE41 to TE45 disposed in the same row, the fifth display area DA05 may include touch electrodes TE51 to TE55 disposed in the same row. When a display operation is performed on each display area, touch electrodes included in each display area may be used as a common electrode.

As described above, the display panel 140 of the display device may be divided into display areas and touch areas having various forms. For example, a touch area or a display area may be divided in units of at least two rows or at least two columns. Alternatively, a touch area and a display area may be divided in units of specific areas (e.g., 2×2, 3×3, 4×3, etc.).

Figure 11:
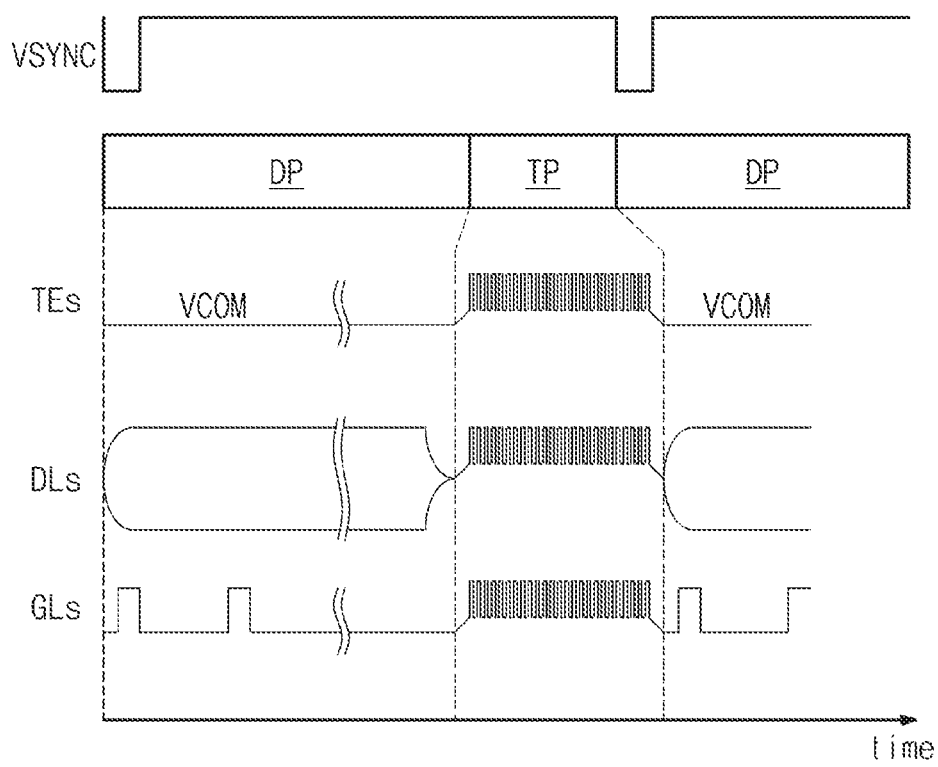
FIG. 11 illustrates operation of a display device according to example embodiments.

FIG. 11 illustrates operation of a display device according to example embodiments. Referring to FIGS. 1 and 11, unlike the operation method of the display device 100 described with reference to FIGS. 1 to 10, there are one display period and one touch period during one cycle of a vertical synchronization signal VSYNC, according to example embodiments in FIG. 11.

For example, the display device 100 may display a single frame on a plurality of pixels of the display panel 140 during one display period. And then, the display device 100 may perform a touch scan operation on each of a plurality of touch electrodes TE included in the display panel 140 during one touch period.

More specifically, during a display period DP, the display device 100 may transmit a data signal to a plurality of pixels PIX through a data line DL and may transmit a gate signal to turn on a transistor included in the pixels through a gate line GL. In example embodiments, a gate signal may be provided to the gate line GL in synchronization with a control signal of an external device (e.g., a timing controller). During the display period DP, the touch electrodes TE may be used as a common electrode for the pixels PIX. That is, a common voltage VCOM is applied to a plurality of touch electrodes TE during the display period DP.

The display device 100 may perform a touch scan operation on the touch electrodes TE during a touch period TP. For example, the display device 100 may provide a sensing signal to the touch electrodes TE during the touch period TP. The touch device 100 may detect variation of the sensing signal and may determine whether a user touches the touch electrodes TE, based on the detection. In example embodiments, the display device 100 may provide a sensing signal to the data line DL and the gate line GL during the touch period TP.

In example embodiments, the display panel 140 may be divided into a plurality of touch areas and may sequentially perform a touch scan operation on each of the touch areas during the touch period TP. For example, the touch panel 140 may be divided into first to fifth touch areas. During one touch period TP, the touch device 100 may perform a touch scan operation on touch electrodes included in the first touch area and then may perform a touch scan operation on touch electrodes included in the second touch area. Similarly, the display device 100 may sequentially perform a touch scan operation on touch electrodes included in the third to fifth touch areas.

In a single touch period TP, the display device 100 may apply a common voltage VCOM to a touch electrode on which a touch scan operation is completed, before a single touch period is terminated. That is, setup time of the common voltage VCOM may be reduced by applying the common voltage VCOM beforehand to touch electrodes on which the touch scan operation is completed, before a touch period is terminated. Thus, a problem such as a horizontal line defect may be suppressed.

Figure 12:
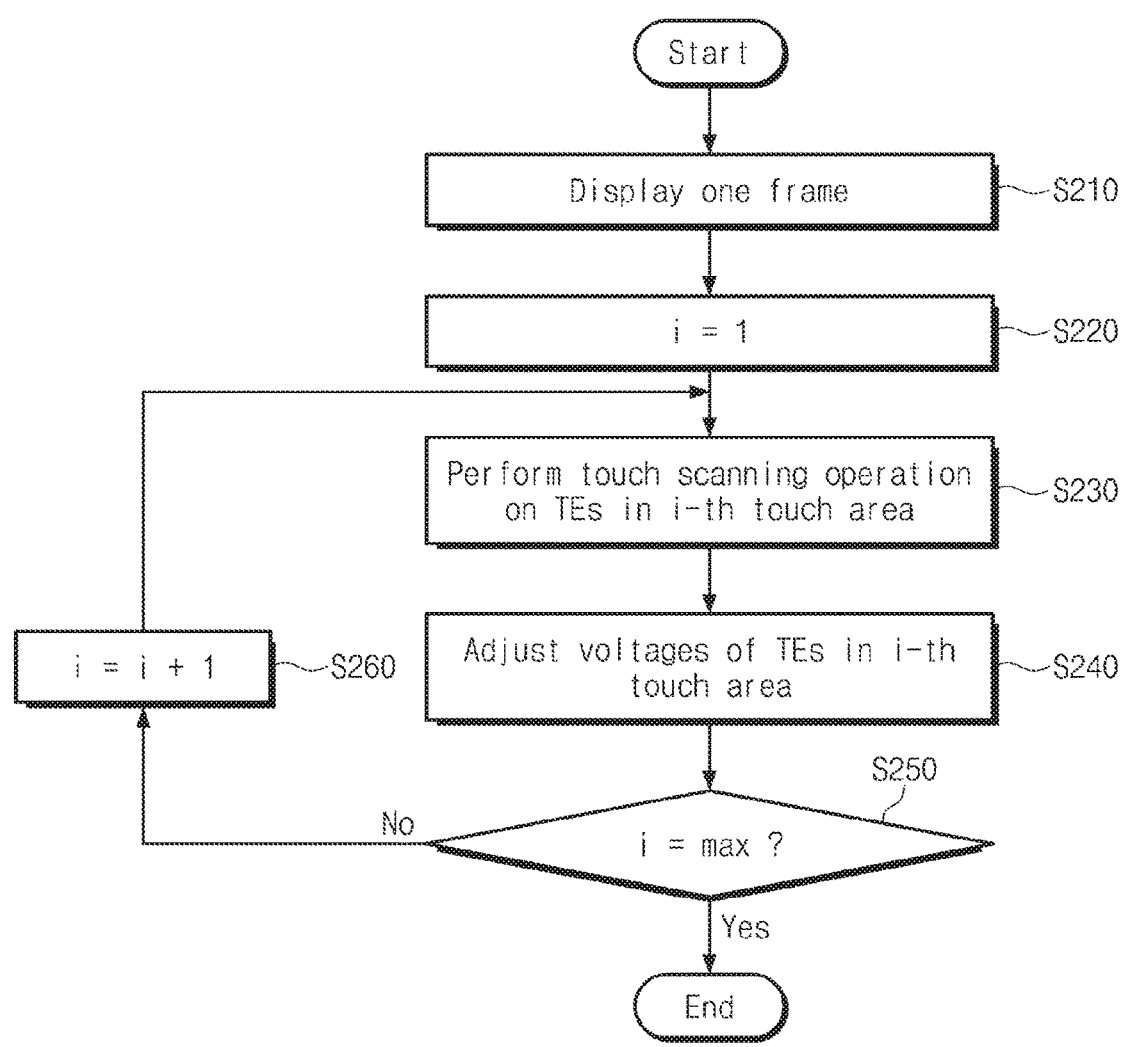
FIG. 12 is a flowchart summarizing an operation method of the display device described with reference to FIG. 11.

FIG. 12 is a flowchart for summarizing an operation method of the display device described with reference to FIG. 11. Now, an operation of the display device 100 during one cycle of a vertical synchronization signal VSYNC will be described with reference to FIG. 12. Referring to FIGS. 1, 11, and 12, in a step S210, the display device 100 may display a single frame on a plurality of pixels of the display panel 140. In example embodiments, while the operation of the step S210 is performed, a plurality of touch electrodes TE of the display panel 140 may be used as a common electrode for a plurality of pixels PIX and the touch electrode TE may be applied with a common voltage VCOM.

In a step S220, a variable i is set to 1. In example embodiments, the variable i is proved to describe a repeated touch scan operation of the display device 100 and does not indicate a specific configuration.

In a step S230, the display device 100 performs a touch scan operation on an $i^{th}$ touch area. For example, the display panel 140 may be divided into a plurality of touch areas. The display device 100 may perform a touch scan operation by providing a sensing signal to touch electrodes included in the $i^{th}$ touch area among a plurality of touch areas.

In a step S240, the display device 100 may adjust a voltage of the touch electrodes included in the $i^{th}$ area (i.e., touch electrodes on which a touch scan operation is completed) to a common voltage VCOM.

In a step S250, the display device 100 may determine whether the variable i is maximum. This means that when the variable i is maximum, a touch scan operation on all the touch areas is completed.

When the variable i is not maximum, the variable i increases to i+1 in a step S260. Then the display device 100 may repeatedly perform operations of the step S230 to the step S260.

As described above, the display device 100 may perform a touch scan operation on a plurality of touch areas during a single touch period. At this point, by applying a common voltage VCOM beforehand to touch electrodes on which the touch scan operation is completed, the display device 100 may improve common voltage (VCOM) setup speed of the touch electrode.

FIGS. 13 to 16 illustrate the operation method described with reference to FIG. 12. For brevity of the drawings, components unnecessary to describe example embodiments will be omitted. For brevity of description, as shown in FIG. 13, it will be assumed that the display panel 140 includes 5×5 touch electrodes TE11 to TE55. In addition, it will be assumed that the display panel 140 is divided into first to fifth touch areas TA01 to TA05. The first to fifth touch areas TA01 to TA05 may correspond with first to fifth columns COL1 to COL5, respectively.

In addition, it will be assumed that a single touch period includes first to fifth sub-touch periods sTP1 to sTP5. In addition, it will be assumed that the display device 100 performs a touch scan operation on each of the first to fifth touch areas TA01 to TA05 in each of the first to fifth sub-touch periods sTP1 to sTP5, respectively.

Figure 14:
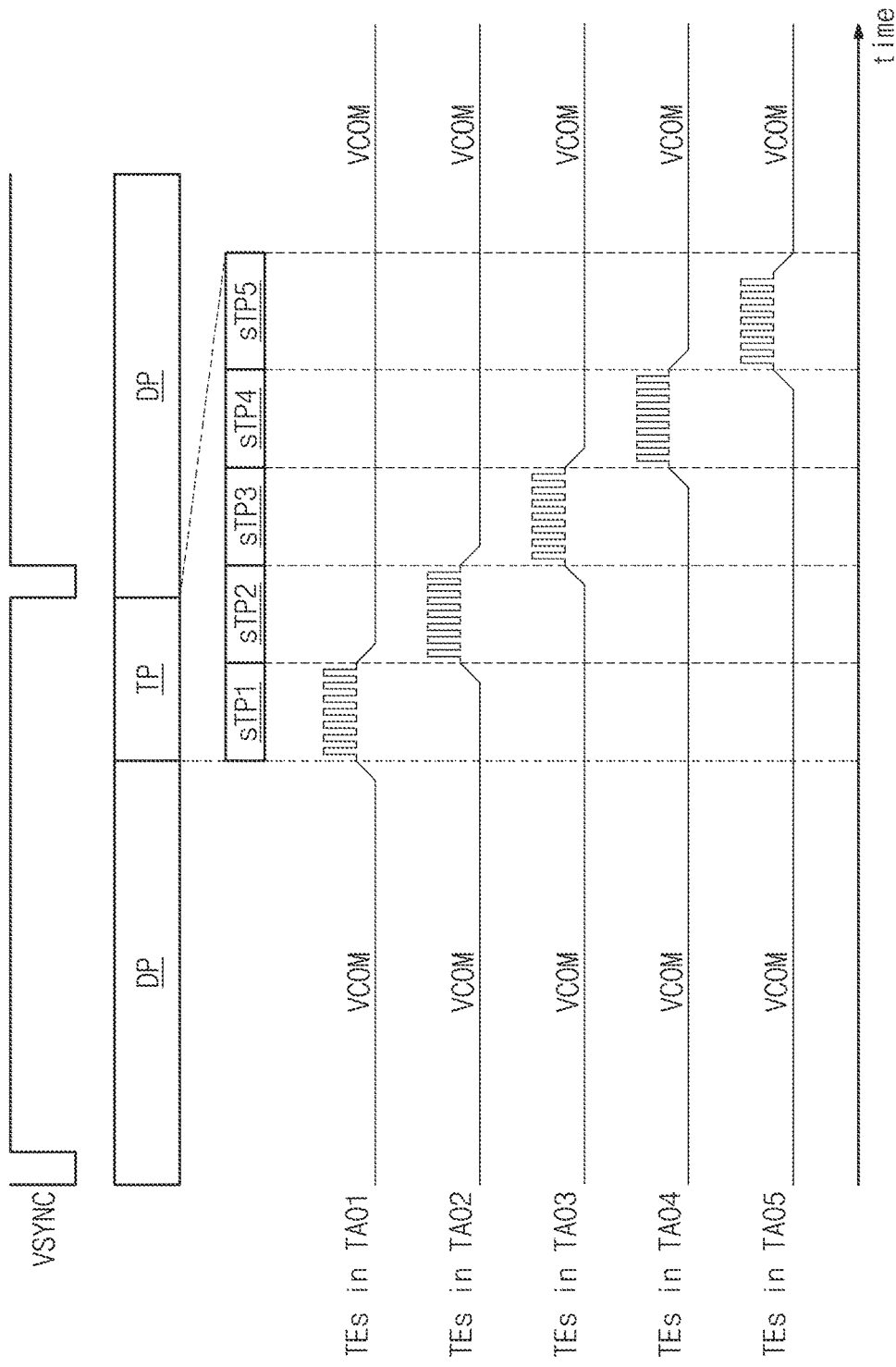

Referring to FIGS. 1, 13, and 14, the display device 100 may display image information on a single frame on a plurality of pixels PIX of the display panel 140 during a display period DP. Since the touch electrodes TE1 to TE55 are used as a common electrode for the pixels PIX, a common voltage VCOM is applied to the touch electrodes TE11 to TE55.

Then the display device 100 may sequentially perform a touch scan operation on a plurality of touch areas TA01 to TA05 during a touch period TP. For example, the touch period TP may include the first to fifth sub-touch periods sTP1 to sTP5. During the first sub-touch period sTP1, the display device 100 may perform a touch scan operation on touch electrodes TE11 to TE51 included in the first touch area TA01. At this point, other touch electrodes (e.g., touch electrodes included in the second to fifth touch areas TA02 to TA05) may be applied with the common voltage VCOM.

After the first sub-touch period sTP1 is completed, the display device 100 may perform a touch scan operation on touch electrodes TE12 to TE52 included in the second touch area TA02 in the second sub-touch period sTP2. At this point, the common voltage VCOM is applied to the touch electrodes TE11 to TE51 of the first touch area TA01 on which the touch scan operation is completed.

Similarly, the display device 100 may perform a touch scan operation in the third to fifth touch areas TA03 to TA05 in the third to fifth sub-touch periods sTP3 to sTP5. At this point, a sensing signal is applied to a touch electrode on which the touch scan operation is performed and the common voltage VCOM is applied to touch electrodes on which the touch scan operation is completed.

As described above, the display device 100 may apply the common voltage to touch electrodes on which a touch scan operation is completed, before the touch period TP is terminated. Since the number of touch electrodes to be applied with the common voltage VCOM at an end point of the touch period TP is decreased, the touch electrode may be rapidly set up to the common voltage VCOM at the end point of the touch period TP. Thus, a problem such as a horizontal line defect may be suppressed in the next display period.

Figure 15:
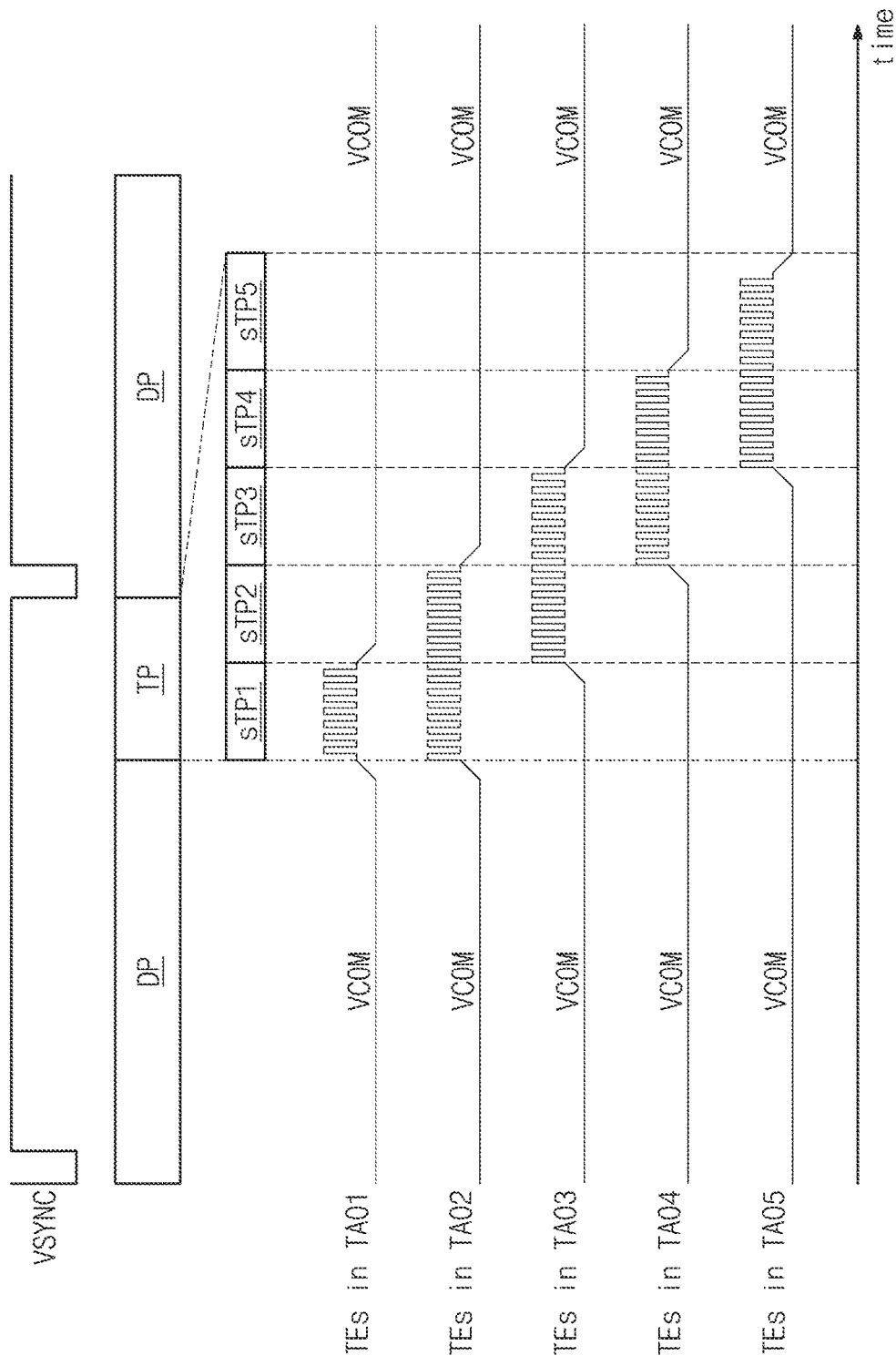

Next, referring to FIGS. 1, 13, and 15, the display device 100 may display image information on a single frame on a plurality of pixels PIX of the display panel 140 during the display period DP. At this point, voltages of the touch electrodes TE1 to TE55 included in the display panel 140 may be the common voltage VCOM.

Similar to the description made with reference to FIG. 14, the display device 100 may sequentially perform a touch scan operation on the first to fifth touch areas TA01 to TA05 during the first to fifth sub-touch periods sTP1 to sTP5. At this point, the display device 100 may provide a sensing signal to touch electrodes on which a touch scan operation is performed in a current sub-touch period and touch electrodes on which the touch scan operation is to be performed in the next sub-touch period.

For example, in the first sub-touch period sTP1, the display device 100 may provide a sensing signal to the touch electrodes TE11 to TE51 of the first touch area TA01 as well as the touch electrodes TE12 to TE52 of the second touch area TA02. The first touch area TA01 indicates a touch area on which a touch scan operation is to be performed in the current sub-touch period (i.e., first sub-touch period sTP1) and the second touch rea TA02 indicates a touch area on which the touch scan operation is to be performed in the next sub-touch period (i.e., second sub-touch period sTP2).

Similarly, in the second sub-touch period sTP2, the display device 100 applies a sensing signal to the touch electrodes TE12 to TE52 and TE13 to TE53 included in the second and third touch areas TA02 and TA03 and performs a touch scan operation on the touch electrodes TE12 and TE52 of the second touch area TA02. The touch electrodes TE13 to TE53 of the third touch area TA03 are touch electrodes on which the touch scan operation is to be performed in the third sub-touch period TA03 that is the next sub-touch period. At this point, the display device 100 may apply the common voltage VCOM to the touch electrodes TE11 to TE51 of the first touch area TA01 on which the touch scan operation is completed.

Similarly, the display device 100 may perform a touch scan operation on the third to fifth touch areas TA03 to TA05 in the third to fifth sub-touch periods sTP3 to sTP5. At this point, the display device 100 may provide a sensing signal to touch electrodes on which the touch scan operation is to be performed in the next sub-touch period, as described above. The display device 100 may provide the common voltage VCOM to touch electrodes on which the touch scan operation is completed.

As described above, by applying the common voltage VCOM to touch electrodes on which a touch scan operation is completed before a single touch period is terminated, the display device 100 improves common voltage (VCOM) setup speed for the touch electrodes. Thus, a problem such as a horizontal line defect that may occur in the beginning of the next display period is suppressed.

Figure 16:
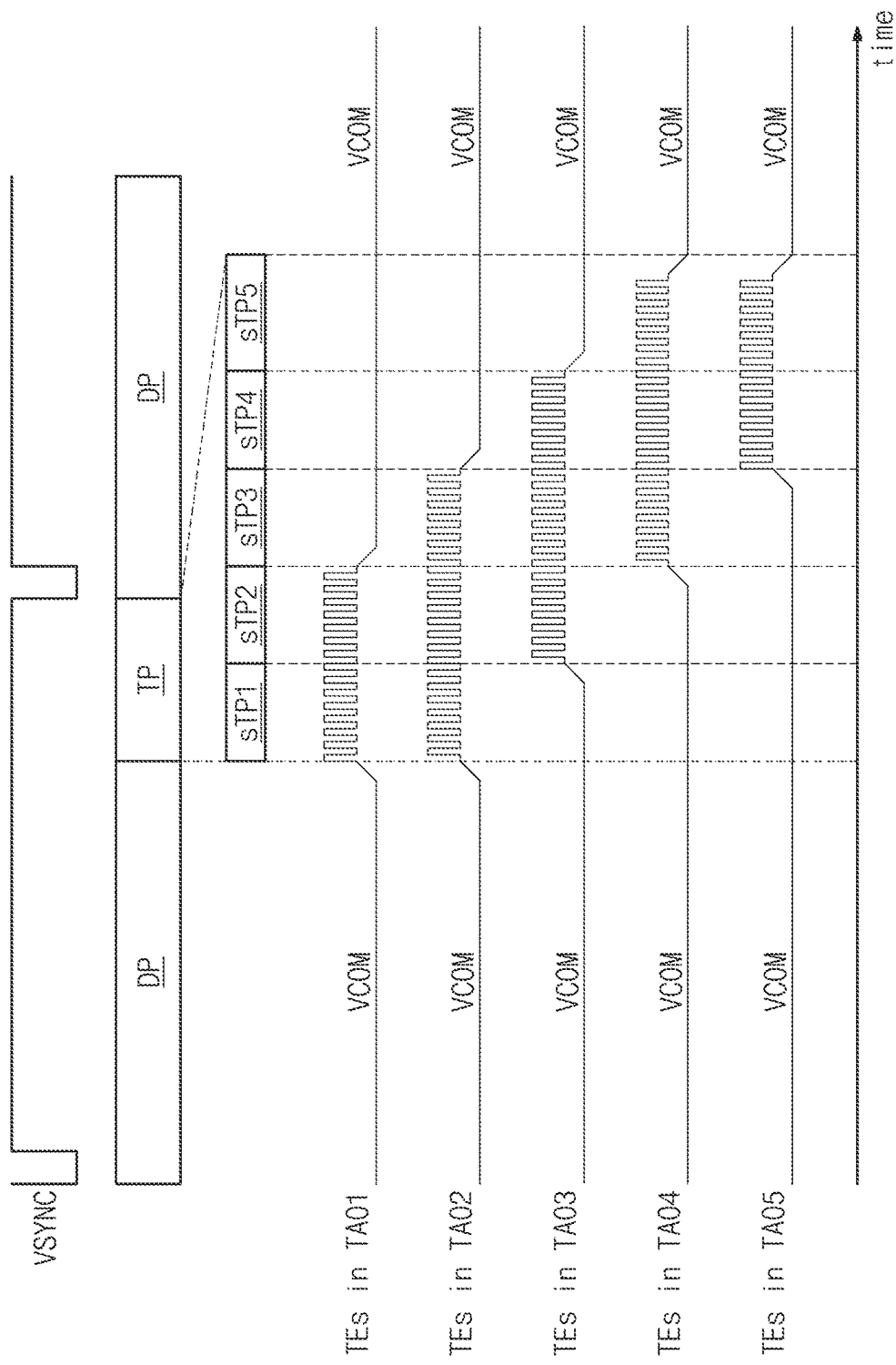

Referring to FIGS. 1, 13, and 16, the display device 100 may display image information on a single frame on a plurality of pixels PIX of the display panel 140 during the display period DP. At this point, voltages of the touch electrodes included in the display panel 140 may each be the common voltage VCOM.

Similar to the description made with reference to FIGS. 14 and 15, the display device 100 may sequentially perform a touch scan operation on the first to fifth touch areas TA01 to TA05 during the first to fifth sub-touch periods sTP1 to sTP5. At this point, the display device 100 may provide a sensing signal to touch electrodes on which the touch scan operation is performed in a current sub-touch period and touch electrodes on which the touch scan operation is to be performed in the next sub-touch period. Additionally, the display device 100 may provide the sensing signal to touch electrodes on which the touch scan operation was performed in a previous sub-touch period.

For example, similar to the above description, the display device 100 performs a touch scan operation on the touch electrodes TE1 to TE51 of the first touch area TA01 during the first sub-touch period sTP1, performs a touch scan operation on the touch electrodes TE12 to TE52 of the second touch area TA02 during the second sub-touch period sTP2, performs a touch scan operation on the touch electrodes TE13 to TE53 of the third touch area TA03 during the third sub-touch period sTP3, performs a touch scan operation on the touch electrodes TE14 to TE54 of the fourth touch area TA04 during the fourth sub-touch period sTP4, and performs a touch scan operation on the touch electrodes TE15 to TE55 of the fifth touch area TA05 during the fifth sub-touch period sTP5.

After providing the sensing signal to the touch electrodes TE11 to TE51 of the first touch area TA01 during the first and second sub-touch periods sTP1 and sTP2, the display device 100 provides the common voltage VCOM to the touch electrodes TE11 to TE51 of the first touch area TA01. After providing the sensing signal to the touch electrodes TE12 to TE52 of the second touch area TA02 during the first to third sub-touch periods sTP1 to sTP3, the display device 100 provides the common voltage VCOM to the touch electrodes TE12 to TE52 of the second touch area TA02. After providing the sensing signal to the touch electrodes TE13 to TE53 of the third touch area TA03 during the second to fourth sub-touch periods sTP2 to sTP4, the display device 100 provides the common voltage VCOM to the touch electrodes TE13 to TE53 of the third touch area TA03. After providing the sensing signal to the touch electrodes TE14 to TE54 of the fourth touch area TA04 during the third to fifth sub-touch periods sTP3 to sTP5, the display device 100 provides the common voltage VCOM to the touch electrodes TE14 to TE54 of the fourth touch area TA04. After providing the sensing signal to the touch electrodes TE15 to TE55 of the fifth touch area TA05 during the fourth and fifth sub-touch periods sTP4 and sTP5, the display device 100 provides the common voltage VCOM to the touch electrodes TE15 to TE55 of the fifth touch area TA05.

In other words, the display device 100 may provide the sensing signal to touch electrodes included in some areas among a plurality of touch areas during a single sub-touch period. However, before a single touch period TP is terminated, the display device 100 may provide the common voltage VCOM beforehand to touch electrodes on which the touch scan operation is completed. In example embodiments, the above-mentioned touch areas may be adjacent touch areas.

As described with reference to FIGS. 13 to 16, the display device 100 may sequentially perform a touch scan operation on a plurality of touch areas during a single touch period TP. Before the single touch period TP is terminated, the display device 100 may apply the common voltage VCOM beforehand to touch electrodes on which the touch scan operation is completed.

The example embodiments and the timing diagrams described with reference to FIGS. 13 to 16 are merely exemplary without being limited thereto. For example, voltage waveforms shown in FIGS. 13 to 16 are schematized for brevity of the drawings, and actual voltage waveforms may be different from graphs shown in FIGS. 13 to 16. A plurality of touch areas may be divided in a row direction, a column direction or column and row directions. In addition, a touch scan operation on each of the touch areas may be performed in a predetermined or arbitrary order.

Figure 17:
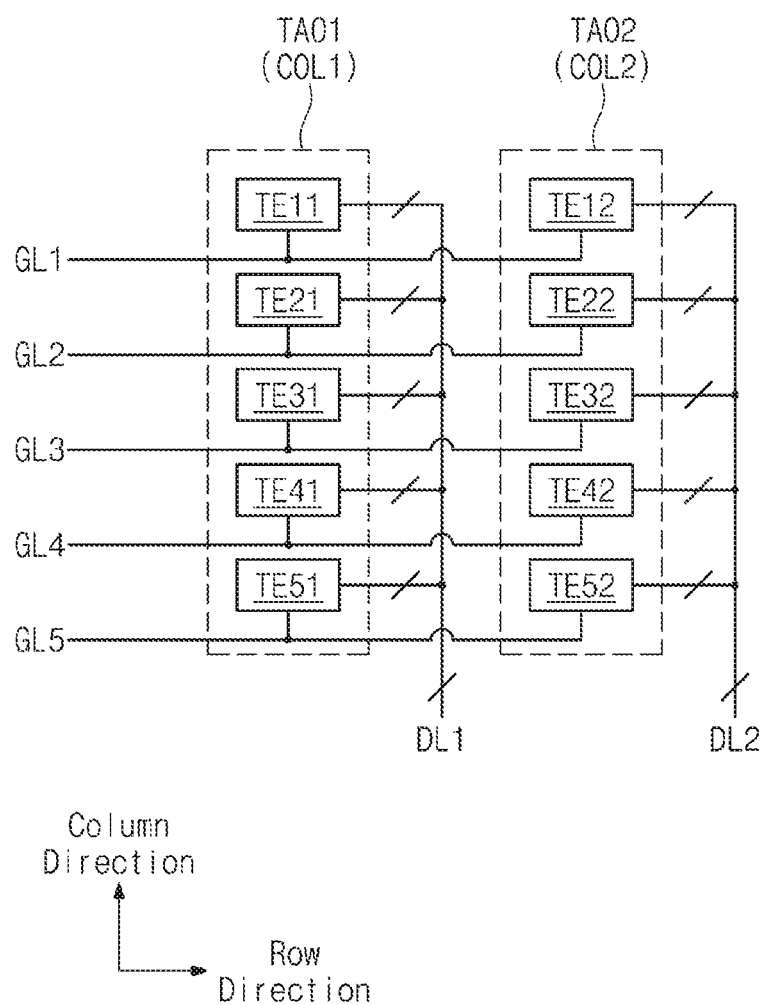
FIGS. 17 and 18 illustrate an operation method of a display device to drive a data line and a gate line during a touch period.
Figure 18:
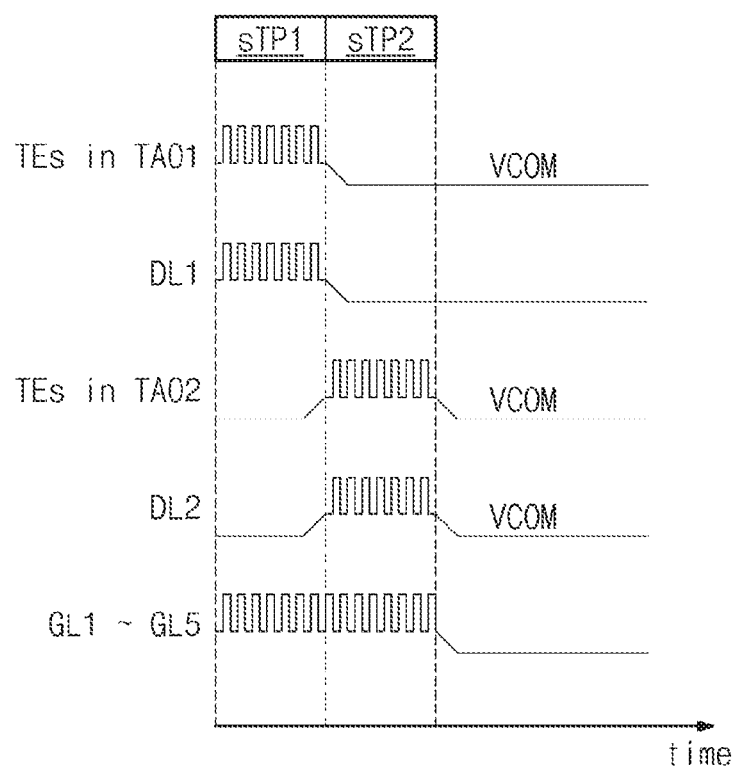

FIGS. 17 and 18 illustrate an operation method of a display device to drive a data line and a gate line during a touch period. For brevity of description, it will be assumed that a display panel 140 includes first and second touch areas TA01 and TA02. Also for brevity of description, example embodiments will be described with reference to first and second sub-touch periods sTP1 and sTP2.

Referring to FIG. 17, similar to the above description, the display panel 140 includes the first and second touch areas TA01 and TA02. The first touch area TA01 may include touch electrodes TE11, TE21, TE31, TE41, and TE51, and the second touch area TA02 may include touch electrodes TE12, TE22, TE32, TE42, and TE52.

In example embodiments, the display panel 140 may include a plurality of pixels PIX corresponding to each of the touch electrodes TE11 to TE51, as described with reference to FIG. 1. Each of the pixels PIX may be connected to gate lines GL1 to GL5 and data lines DL1 and DL2. For example, at least one pixel PIX corresponding to the touch electrode TE1 may be connected to the first data lines DL1 and the first gate lines GL1. In this case, a single pixel may be connected to a single data line and a single gate line. Similarly, each of the pixels PIX may be connected to the first and second data lines DL1 and DL2 and the first to fifth gate lines GL1 to GL5. In example embodiments, the first data lines DL1 may include at least one data line, the second data line DL2 may include at least one data line, and each of the first to fifth gate lines GL1 to GL5 may include at least one gate line.

Referring to FIGS. 1, 17, and 18, during the first sub-touch period sTP1, the display device 100 may perform a touch scan operation by providing a sensing signal to the touch electrodes TE11 to TE51 of the first touch area TA01. At this point, the sensing signal may be provided to data lines (i.e., the first data line DL1) and gate lines (i.e., the first to fifth gate lines GL1 to GL5) connected to pixels corresponding to the touch electrodes TE11 to TE51 of the first touch area TA01.

During the second sub-touch period sTP2, the display device 100 may perform a touch scan operation by providing the sensing signal to the touch electrodes TE12 to TE52 of the second touch area TA02. At this point, the sensing signal may be provided to gate lines (i.e., the second data line DL2) and gate lines (i.e., the first to fifth gate line GL1 to GL5) connected to pixels corresponding to the touch electrodes TE12 to TE52 of the second touch area TA02.

In example embodiments, parasitic capacitance in a display panel may be cancelled by providing a sensing signal to gate lines and data lines during a touch scan operation. Thus, capacitance variation (or variation of the sensing signal) between a touch electrode and a user's body part may be readily sensed.

As described above, a sensing signal may be provided to data lines and gate lines connected to pixels included in a touch area on which a touch scan operation is performed (i.e., pixels corresponding to a touch electrode). However, example embodiments are not limited thereto and the sensing signal provided to the data lines and the gate lines or providing timing of the sensing signal may be variously changed.

Figure 19:
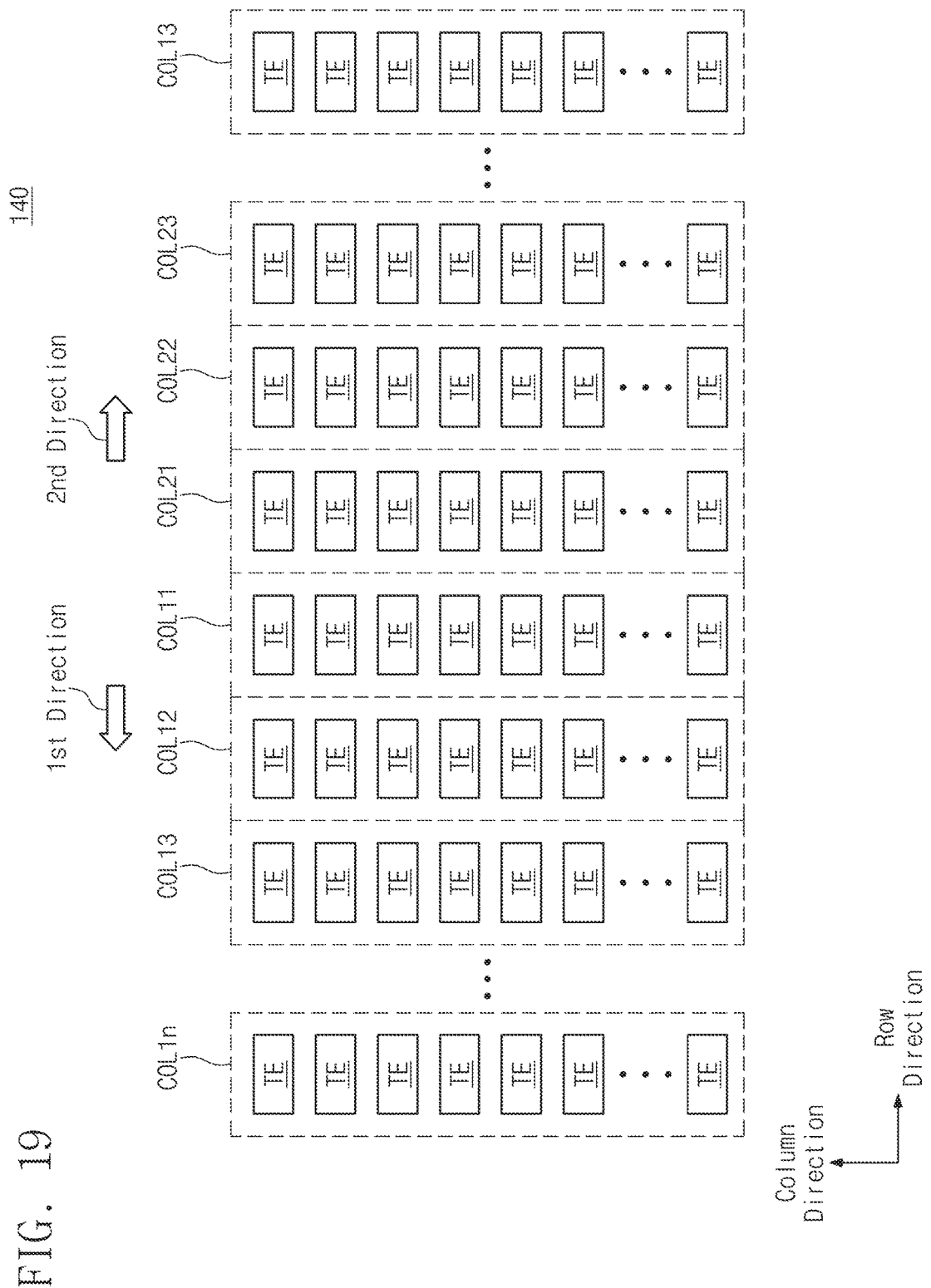
FIG. 19 illustrates the sequence of a touch scan operation of the display device in FIG. 1.

FIG. 19 illustrates the sequence of a touch scan operation of the display device 100 in FIG. 1. For brevity of description, components unnecessary to describe the order of the touch scan operation will be omitted. A display panel 140 may include a plurality of touch electrodes TE. The display panel 140 may be divided into a plurality of columns COL11 to COL1n and COL21 to COLm. Each of the columns COL11 to COL1n and COL21 to COLm may indicate a touch area.

The display device 100 may perform a touch scan operation on each of the columns COL11 to COL1n and COL21 to COLm in a touch period TP. The display device 100 may sequentially perform the touch scan operation on each of the columns COL11 to COL1n in a first direction. Additionally, the display device 100 may sequentially perform the touch scan operation on each of the columns COL21 to COLm in a second direction. In other words, the display device 100 may perform the touch scan operation on the columns COL11 and COL22 at the same time and then may perform the touch scan operation on the columns COL12 and COL22 at the same time.

As described above, the display device 100 may divide the display panel 140 into a plurality of touch areas and may perform a touch scan operation on each of the touch areas in a sequential or arbitrary order. At this point, as described above, the display device 100 applies a common voltage VCOM beforehand to a touch electrode TE on which the touch scan operation is completed, before the touch period TP is terminated. Thus, the display device 100 may reduce time required to set up the touch electrode TE to the common voltage VCOM. As a result, a problem such as a horizontal line defect that may occur in the beginning of the next display period may be suppressed.

Figure 21:
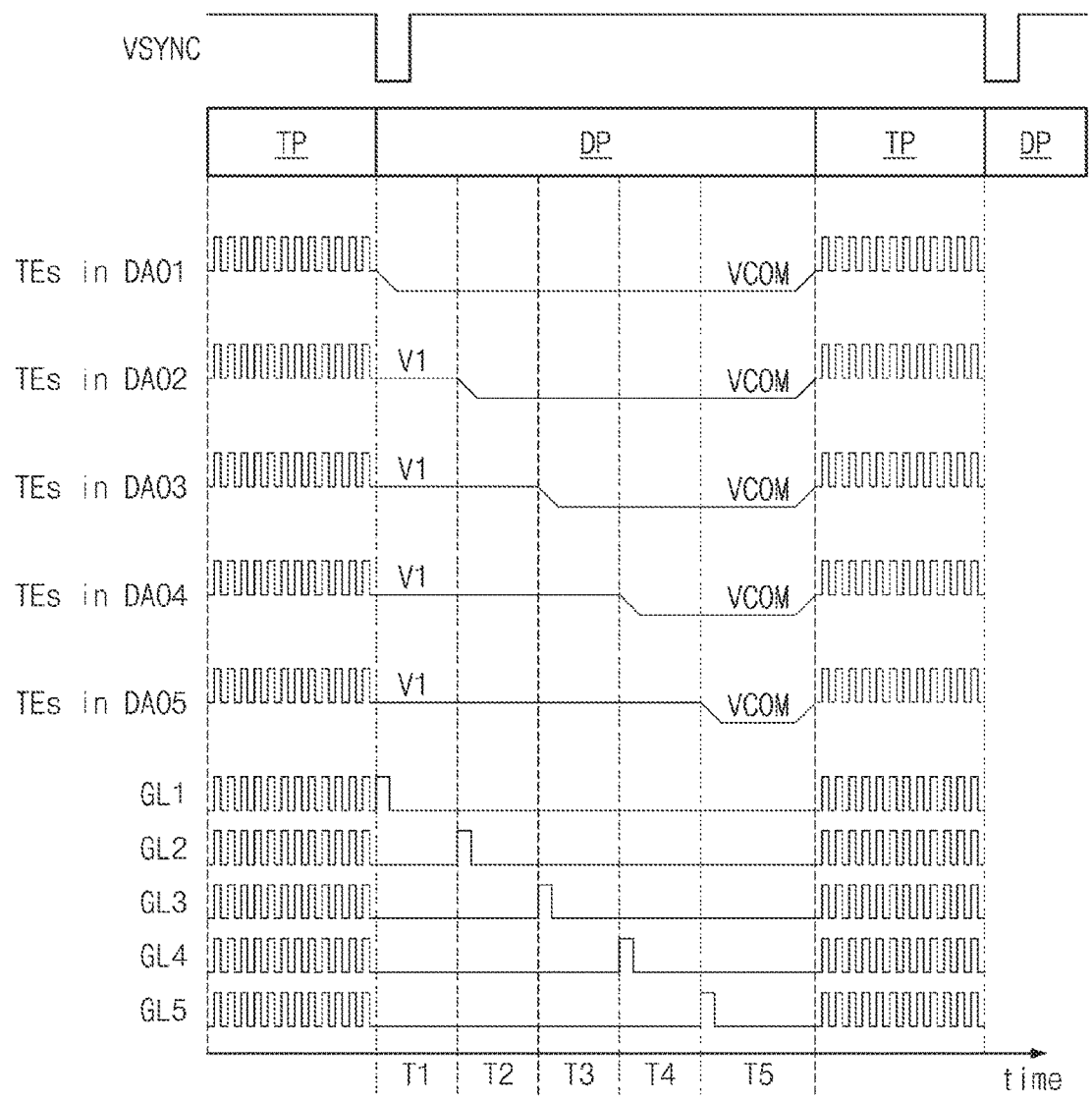

FIGS. 20 and 21 illustrate another operation method of the display device in FIG. 1. For brevity of description, components unnecessary to describe example embodiments will be omitted. Referring to FIGS. 1, 20, and 21, similar to above description, the display panel 140 includes a plurality of touch electrodes TE1 to TE55.

In example embodiments, a plurality of pixels PIX included in the display panel 140 will be omitted for brevity of the drawing. Each of the pixels PIX may be disposed to overlap a plurality of touch electrodes TE1 to TE55. Although it is shown in FIG. 20 that first to five gate lines GL1 to GL5 are connected to the touch electrodes TE1 to TE55, the gate lines GL1 to GL5 are actually connected to the pixels PIX disposed to overlap the touch electrodes TE1 to TE55, respectively. The pixels PIX may receive a gate signal from the gate driver IC 120 through the gate lines GL1 to GL5 and may compare a common voltage of a corresponding touch electrode with a data signal (i.e., a data signal received through a data line).

As shown in FIG. 21, one cycle of the vertical synchronization signal VSYNC may include a single display period DP and a single touch period TP. The display device 100 may display image information of a single frame on a plurality of pixels during the single display period DP. The display device 100 may perform a touch scan operation on each of a plurality of touch electrodes during the single touch period TP.

For example, the display device 100 may perform a touch scan operation on each of the touch electrodes TE11 to TE55 during the touch period TP. In example embodiments, the touch scan operation may be performed in various manners, as described with reference to FIGS. 1 to 19. In example embodiments, the display device 100 may provide a sensing signal to the first to fifth gate lines GL1 to GL5.

Then in the display period DP, the display device 100 may display image information on the pixels PIX. For example, the display panel 140 may be divided into first to fifth display areas DA01 to DA05, as shown in FIG. 20. In example embodiments, each of the first to fifth display areas DA01 to DA05 may include pixels sharing the same gate line. For example, the first display area DA01 may include a plurality of pixels connected to the first gate line GL1, the second display area DA02 may include a plurality of pixels connected to the second gate line GL2, the third display area DA03 may include a plurality of pixels connected to the third gate line GL3, the fourth display area DA04 may include a plurality of pixels connected to the fourth gate line GL4, and the fifth display area DA05 may include a plurality of pixels connected to the fifth gate line GL5.

The display device may sequentially display image information on the first to fifth display areas DA01 to DA05 in the display period DP.

For example, in a first period T1, the display device 100 may display image information on pixels of the first display area DA01. At this point, a gate signal of the first gate line GL1 is toggled on. A common voltage may be applied to the touch electrodes TE11 to TE15 included in the first area DA01 to display the image information on the pixels of the first display area DA01. At this point, a first voltage V1 may be applied to touch electrodes of the second to fourth display areas DA02 to DA04. The first voltage V1 may be a ground voltage GND or a specific voltage different from the common voltage VCOM.

In a second period T2, the display device 100 may display image information on pixels of the second display area DA02. At this point, a gate signal of the second gate line GL2 is toggled on. The common voltage VCOM may be applied to the touch electrodes TE21 to TE25 included in the second area DA02 to display image information on the pixels of the second display area DA02. Similarly, in the third to fifth periods T3 to T5, the display device 100 may display image information on pixels of the third to fifth display areas DA03 to DA05, respectively. At this point, gate signals of the third to fifth gate lines GL3 to GL5 are toggled on. The common voltage VCOM may be applied to touch electrodes included in the third to fifth display areas DA03 to DA05 to display the image information on the pixels of the third to fifth display areas DA03 to DA05.

As described above, after the touch period TP is terminated, the display device 100 may apply the common voltage VCOM to some touch electrodes TE and may apply a first voltage V1 different from the common voltage VCOM to the other touch electrodes TE. Then in synchronization with a specific control signal (e.g., a gate signal or another control signal), the common voltage VCOM may be sequentially applied to touch electrodes TE corresponding to pixels on which the image information is to be displayed. Accordingly, since common voltage (VCOM) setup speed of the touch electrode TE is improved, a problem such as a vertical line defect may be suppressed. The above embodiments are merely exemplary, and inventive concepts are not limited thereto.

Figure 22:
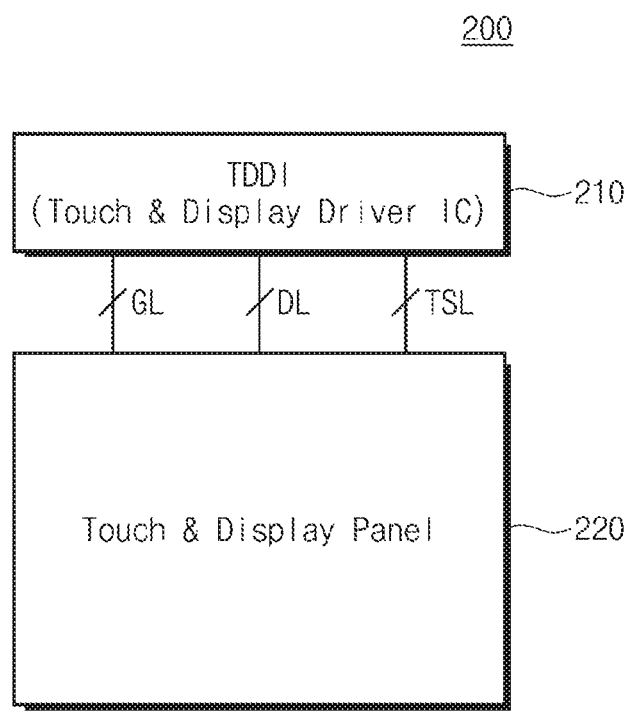
FIG. 22 is a block diagram of a display device according to example embodiments.

FIG. 22 is a block diagram of a display device 200 according to example embodiments. As illustrated, the display device 200 includes a touch and display driver IC 210 and a display panel 220. In example embodiments, the touch and display driver IC 210 may include a source driver IC 110, a gate driver IC 120, and a touch driver IC 130 described with reference to FIG. 1. That is, the touch and display driver IC 210 may be implemented using a single chip, a single die or a single package. The touch and display panel 220 may be identical to the display panel 140 described with reference to FIGS. 1 to 21.

FIG. 23 is a block diagram of an integrated circuit 300 according to example embodiments. The integrated circuit 300 may include a touch driving unit 310 operating as a touch driver IC and a display driving unit 330 operating as a source driver IC (or a gate driver IC or a display driver IC). As shown in FIG. 23, the touch driving unit 310 and the display driving unit 330 may also be referred to as touch screen controller (TSC) block 310 and display driver block 330, respectively. The touch driving unit 310 and the display driving unit 330 may be integrated into a single semiconductor chip, a single semiconductor die or a single semiconductor package to reduce manufacturing costs. In addition, a sensing signal of the touch driving unit 310 and a single generated from the display driving unit 330 may be synchronized with each other to reduce an influence caused by a noise during a touch screen operation.

The touch driving unit 310 may include various components for the touch screen operation. For example, the touch driving unit 310 may include a readout circuit 311, a parasitic capacitance compensation unit 312, an analog-digital converter (ADC) 313, a power supply voltage generator 314, a memory 315, a microcontroller unit (MCU) 316, a low-power oscillator 318, an interface unit 319, and a control logic 320.

The readout circuit 311 may generate touch data. The compensation unit 312 may decrease or compensate a parasitic capacitance element of a sensing unit. The ADC 313 may convert analog data into a digital signal. The power supply voltage generator 314 may generate a power supply voltage. The oscillator 318 may generate a low-power oscillation signal. The interface 319 may transmit/receive a signal to/from a host controller 400.

The display driving unit 330 may include a source driving unit 331, a grayscale voltage generator 332, a display memory 333, a timing control logic (TCON) 334, a power supply voltage generator 335, and a central processing unit (CPU) and interface unit 336.

A source driving unit 331 may generate grayscale data. The memory 333 may store display data. The timing control logic 334 may generate a control signal (or a synchronization signal) to control respective components of the display driving unit 330. The power supply voltage generator 335 may generate one or more power supply voltages. The CPU and interface unit 336 may control the overall operation in the display driving unit 330 or may perform communication with the host controller 400.

The touch driving unit 310 may receive at least one timing information from the display driving unit 330. For example, the control logic 320 in the touch driving unit 310 may receive various timing information (e.g., VSYCN, HSYCN, DOTCLK, etc.) synchronized with a display output signal from the timing control logic 334 in the display driving unit 330. The control logic 320 may generate a control signal to control a generation point of touch data using the received timing information.

In example embodiments, the display driving unit 330 may receive at least one information from touch driving unit 310. For example, the display driving unit 330 may receive a status signal (e.g., a sleep status signal) from the touch driving unit 310, as shown in FIG. 23. The display driving unit 330 may receive the sleep status signal from the touch driving unit 310 and may perform a corresponding operation in response to the received signal.

The touch driving unit 310 is in a sleep status, which means that a touch operation is not performed for a predetermined period of time. In this case, the display driving unit 330 may stop providing the timing information to the touch driving unit 310. Thus, power of a device including the integrated circuit 300 (e.g., a mobile device) may be efficiently used.

As shown in FIG. 23, each of the touch driving unit 310 and the display driving unit 330 includes a circuit block for generating power, a memory for storing predetermined data, and a control unit for controlling functions of each block. Accordingly, when the touch driving unit 310 and the display driving unit 330 are integrated into a single semiconductor chip, the memory, a power generator, and the control unit may be implemented to be commonly used in the touch driving unit 310 and the display driving unit 330.

Figures 24A, 24B:
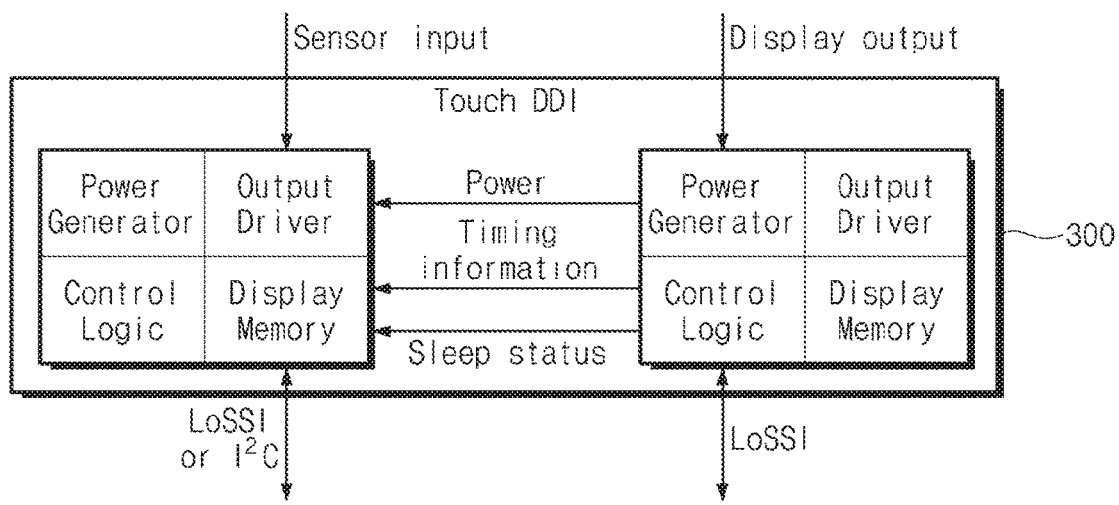
FIGS. 24A and 24B illustrate a relationship between a power supply voltage and timing between a touch driving unit and a display driving unit in FIG. 23.

FIGS. 24A and 24B illustrate a relationship between a power supply voltage and timing between the touch driving unit 310 and the display driving unit 320 in FIG. 23. Referring to FIGS. 23 and 24, an integrated circuit 300 for driving a display device may include a touch driving unit 310 and a display driving unit 320, as shown in FIG. 24A. The touch driving unit 310 and the display driving unit 320 may transmit/receive at least one information such as timing information and status information to/from each other. In addition, the touch driving unit 310 and the display driving unit 320 may provide or receive a power supply voltage to or from each other.

For ease of description and brevity of the drawing, a simplified touch driving unit 310 and a simplified display driving unit 320 are shown in FIGS. 24A and 24B. However, an analog front end included in the touch driving unit 310 may be a block including a voltage readout circuit, an amplifier circuit, an integration circuit, an ADC, and the like.

The touch driving unit 310 of a display device according to example embodiments may provide sleep status information to the display driving unit 320. For example, a power supply voltage used in the touch driving unit 310 may be described below through an example embodiment of an operation provided from the display driving unit 320.

As shown in FIG. 24A, in the case that a touch input does not operate while a screen is turned off (both a TSC and a display are all in a sleep status), the display driving unit 320 blocks supply of a power supply voltage or timing information to the touch driving unit 310. In this case, only a register in the display driving unit 320 may be maintained at a previously status. Thus, power consumption may be minimized.

In the case that the touch input is blocked and only a display is enabled (the TSC is in a sleep status and the display is in a normal status), the display driving unit 320 generates a power supply voltage to be internally consumed but the touch driving unit 310 does not consume power. Thus, the display driving unit 320 does not provide the power supply voltage to the touch driving unit 310. In addition, the display driving unit 320 does not provide timing information to the touch driving unit 310.

In the case that the touch input is enabled and the display is disabled (the TSC is in a normal status and the display is in a sleep status), a check is made as to whether a touch operation is periodically performed, because the touch input is enabled. In this case, the display driving unit operates in a low-power mode and is maintained at a disable status. However, the display driving unit 320 generates timing information and a power supply voltage used in the touch driving unit and provides the timing information and the power supply voltage to the touch driving unit 310 to check whether the touch operation is performed.

In the typical case that both the touch input and the display are enabled (both the TSC and the display are in a normal status), the display driving unit 320 generates timing information and a power supply voltage and provides the timing information and the power supply voltage to the touch driving unit 310.

To sum up the above four cases, a power supply voltage generator of a display driving unit may generate a power supply voltage when at least one of the touch driving unit and the display driving unit is enabled. In addition, a control logic of the display driving unit may generate timing information only when the touch driving unit operates and may provide the timing information to the touch driving unit.

Figure 25:
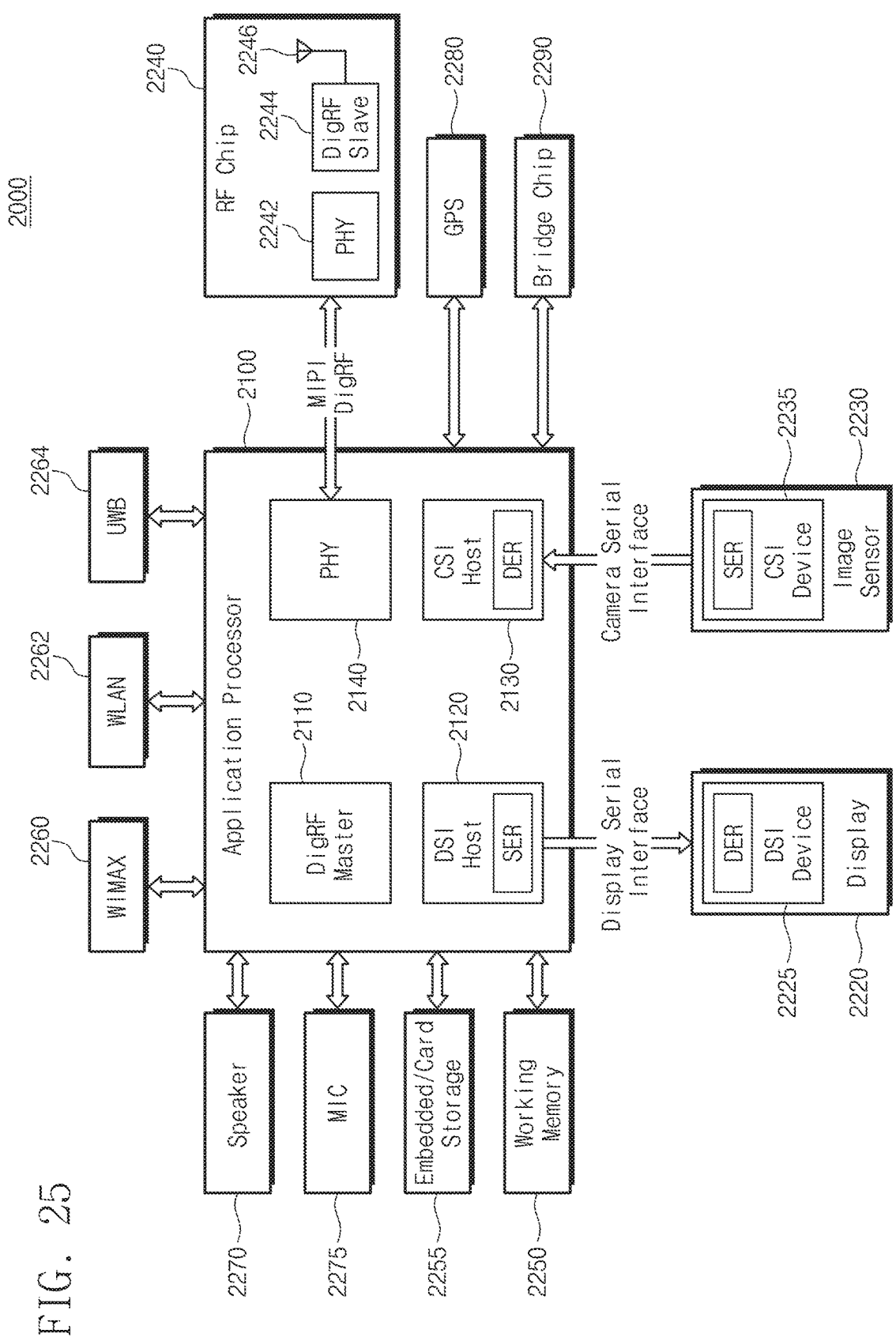
FIG. 25 is a block diagram of an electronic system to which a display device according to example embodiments is applied.

FIG. 25 is a block diagram of an electronic system 2000 to which a display device according to example embodiments is applied. As illustrated, the electronic system 2000 may be implemented in the form of a mobile communication terminal, a personal digital assistant (PDA), a portable multimedia player (PMP), a smartphone or a wearable device.

The electronic system 2000 may include an application processor 2100, a display 2220, and an image sensor 2230. The application processor 1100 may include a DigRF master 2110, a display serial interface (DSI) host 2120, a camera serial interface (CSI) host 2130, and a physical layer 2140.

The DSI host 2120 may communicate with a DSI device 2225 of the display 2200 through DSI. In example embodiments, an optical serializer SER may be implemented in the DSI host 2120 and an optical deserializer DES may be implemented in the DSI device 2225. In example embodiments, the display 2220 may be a display device having a touch function described with reference to FIGS. 1 to 20. The display 2220 may operate according to the operation method described with reference to FIGS. 1 to 20.

The CSI host 2130 may communicate with a CSI device 2235 of the image sensor 2230 through CSI. In example embodiments, an optical deserializer DES may be implemented in the CSI host 2130 and an optical serializer SER may be implemented in the CSI device 2235.

The electronic device 2000 may further include a radio frequency (RF) chip 2240 communicating with the application processor 2100. The RF chip 1240 may include a physical layer 2242, a DigRF slave 2244, and an antenna 2246. In example embodiments, data may be exchanged between the physical layer 2242 of the RF chip 2240 and the physical layer 2140 of the application processor 2100 through MPI DigRF through an MIPI DigRF interface.

The electronic system 2000 may further include a working memory 2250 and an embedded/card storage 2255. The working memory 2250 and the embedded/card storage 2255 may store data provided from the application processor 2100. The working memory 2250 and the embedded/card storage 2255 may provide the stored data to the application processor 2100.

The working memory 2250 may temporarily store data processed by the application processor 2100 or data to be processed by the application processor 2100. The working memory 2250 may include a volatile memory such as static random-access memory (SRAM), dynamic RAM (DRAM), and synchronous DRAM (SDRAM) or a nonvolatile memory such as flash memory, parameter RAM (PRAM), magnetoresistive RAM (MRAM), resistive RAM (ReRAM), and ferroelectric RAM (FRAM).

The embedded/card storage 2255 may store data irrespective of whether power is supplied.

The electronic system 2000 may communicate with an external system via World Interoperability for Microwave Access (WiMAX) 2260, Wireless Local Area Network (WLAN) 2262, Ultra Wideband (UWB) 2264, and the like.

The electronic system 2000 may further include a speaker 2270 and a microphone 2275 to process audio information. In example embodiments, the electronic system 2000 may further include a global positioning system (GPS) device 2280 to process position information. The electronic system 2000 may further include a bridge to manage connection with peripheral devices.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The foregoing example embodiments are merely exemplary and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A touch display driving integrated circuit (IC) repeatedly providing a plurality of display periods and a plurality of touch periods in each cycle of a vertical synchronization signal, the touch display driving IC comprising:

a touch driver IC connected to touch electrodes through touch sensing lines, the touch driver IC being configured to:
  in a touch period, provide a sensing signal to first touch sensing lines among the touch sensing lines and a first voltage to second touch sensing lines different from the first touch sensing lines among the touch sensing lines, and
  in a display period immediately following the touch period, apply a common voltage to the second touch sensing lines and apply a second voltage to the first touch sensing lines; and
a source driver IC configured to be connected to pixels through data lines, and to provide a data signal to the data lines in the display period immediately following the touch period,
wherein the first voltage and the second voltage are a same voltage and are one of a ground voltage, a floating voltage, and a specific voltage different from the common voltage.

2. The touch display driving IC as set forth in claim 1, wherein each of the first and second voltages is the ground voltage.

3. The touch display driving IC as set forth in claim 1, wherein each of the first and second voltages is the floating voltage.

4. The touch display driving IC as set forth in claim 1, wherein the touch driver IC is further configured to sense variation of the sensing signal provided to the first touch sensing lines and detect a touch with first touch electrodes connected to the first touch sensing lines in the touch period based on the sensed variation.

5. The touch display driving IC as set forth in claim 1, wherein the source driver IC is further configured to provide the data signal to first pixels among the pixels through the data lines in the display period.

6. The touch display driving IC as set forth in claim 5, wherein second touch electrodes connected to the second touch sensing lines are operated as common electrodes for the first pixels in the display period.

7. The touch display driving IC as set forth in claim 1, wherein the source driver IC is further configured to provide the sensing signal to the data lines in the touch period.

8. The touch display driving IC as set forth in claim 1, wherein the touch driver IC comprises:
  a control logic circuit configured to generate a switching signal; and
  a switching circuit connected to the touch sensing lines, and configured to switch among a common voltage node providing the common voltage, a ground voltage node, and touch sensing circuits in response to the switching signal.

9. The touch display driving IC as set forth in claim 8, wherein the switching circuit is further configured to connect each of the touch sensing lines to one of the common voltage node, the ground voltage node, and the touch sensing circuits in response to the switching signal.

10. The touch display driving IC as set forth in claim 1, further comprising:
  a gate driver IC configured to be respectively connected to the pixels through gate lines,
  wherein the gate driver IC provides the sensing signal to the gate lines in the touch period and provides gate signals to the gate lines in the display period.

11. An operation method of a touch display driving integrated circuit (IC) configured to be connected to touch electrodes through touch sensing lines and to be connected to pixels through data lines, the touch signal driving IC repeatedly providing a plurality of display periods and a plurality of touch periods in each cycle of a vertical synchronization signal, the operation method comprising:
  providing a sensing signal to first touch sensing lines among the touch sensing lines and a first voltage to second touch sensing lines different from the first touch sensing lines among the touch sensing lines to perform a touch scan operation in a touch period;
  applying a common voltage to the second touch sensing lines and a second voltage to the first touch sensing lines in a display period immediately following the touch period;
  providing a data signal to the data lines in the display period immediately following the touch period,
  wherein the first voltage and the second voltage are a same voltage and are one of a ground voltage, a floating voltage, and a specific voltage different from the common voltage.

12. The operation method as set forth in claim 11, wherein each of the first and second voltages is the ground voltage.

13. The operation method as set forth in claim 11, wherein each of the first and second voltages is the floating voltage.

14. The operation method as set forth in claim 11, further comprising
  performing the touch scan operation to sense variation of the sensing signal provided to the first touch sensing lines; and
  determining a touch with first touch electrodes respectively connected to the first touch sensing lines based on the sensed variation.

15. The operation method as set forth in claim 11, further comprising:
  providing the sensing signal to the data lines in the touch period.

16. A touch display device comprising:
  a display panel including a plurality of touch electrodes and a plurality of pixels;
  a touch driver integrated circuit (IC) connected to the plurality of touch electrodes through touch sensing lines and repeatedly providing a plurality of display periods and a plurality of touch periods in each cycle of a vertical synchronization signal,
  wherein the touch driver IC is configured to:
    in a touch period, perform a touch scan operation on first touch electrodes among the plurality of touch electrodes and provide a first voltage to second touch electrodes different from the first touch electrodes among the plurality of touch electrodes, and
    in a display period immediately following the touch period, apply a common voltage to the second touch electrodes and apply a second voltage to the first touch electrodes; and
  a source driver IC configured to be connected to the plurality of pixels through data lines, and to provide a data signal to the data lines in the display period immediately following the touch period,
  wherein the first voltage and the second voltage are a same voltage and are one of a ground voltage, a floating voltage, and a specific voltage different from the common voltage.

17. The touch display device as set forth in claim 16, further comprising:
  a gate driver IC connected to the plurality of pixels through gate lines.

18. The touch display device as set forth in claim 17, wherein the touch driver IC, the gate driver IC, and the source driver IC are included in a single semiconductor chip.

19. The touch display device as set forth in claim 17, wherein in the display period, first pixels among the plurality of pixels compare voltages of corresponding data line among the data lines with the common voltage of the second touch electrodes, and display image information based on a result of the comparison.

20. The touch display device as set forth in claim 16, wherein the display panel is an in-cell display panel.

* * * * *